US012645199B2

(12) United States Patent
Uozumi et al.

(10) Patent No.: US 12,645,199 B2
(45) Date of Patent: Jun. 2, 2026

(54) NUMERICAL CONTROL DEVICE AND NUMERICAL CONTROL METHOD

(71) Applicant: Mitsubishi Electric Corporation, Tokyo (JP)

(72) Inventors: Seiji Uozumi, Tokyo (JP); Nobuyuki Sumi, Tokyo (JP); Shun Kayashima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 334 days.

(21) Appl. No.: 18/288,997

(22) PCT Filed: May 7, 2021

(86) PCT No.: PCT/JP2021/017515
§ 371 (c)(1),
(2) Date: Oct. 31, 2023

(87) PCT Pub. No.: WO2022/234658
PCT Pub. Date: Nov. 10, 2022

(65) Prior Publication Data
US 2024/0231312 A1     Jul. 11, 2024

(51) Int. Cl.
*G05B 19/40* (2006.01)
*G05B 19/18* (2006.01)
*G05B 19/4099* (2006.01)

(52) U.S. Cl.
CPC ....... *G05B 19/4099* (2013.01); *G05B 19/182* (2013.01); *G05B 2219/49007* (2013.01); *G05B 2219/49018* (2013.01)

(58) Field of Classification Search
None
See application file for complete search history.

(56) References Cited

U.S. PATENT DOCUMENTS 6,471,800 B2 * 10/2002 Jang ........................ B29C 64/40
                                                   156/305
10,520,923 B2 * 12/2019 Connor ................... B22F 10/85
(Continued)

FOREIGN PATENT DOCUMENTS

CN      104950820 A    9/2015
JP      2002-115004 A   4/2002
(Continued)

OTHER PUBLICATIONS

Zhao et al., "Shape and Performance Controlled Advanced Design for Additive Manufacturing: A Review of Slicing and Path Planning", Jun. 2018, Journal of Manufacturing Science and Engineering Jan. 2020, vol. 142 (Year: 2018).*
(Continued)

*Primary Examiner* — Kelvin Booker
(74) *Attorney, Agent, or Firm* — XSENSUS LLP

(57) ABSTRACT

An NC device includes an additive manufacturing execution unit that controls an additive manufacturing process for producing a shaped object by stacking layers of a material melted, a subtractive manufacturing execution unit that controls a subtractive manufacturing process for cutting the shaped object using a tool, a status analysis unit that analyzes a machining status of the shaped object based on sensor data obtained by monitoring of the machining status of the shaped object produced by a combination of the additive and subtractive manufacturing processes, a production process change unit that outputs, to the additive and subtractive manufacturing execution units, a switching command that commands switching a production process, based on the analysis of the machining status, and a process condition generation unit that determines a process condition to be used in a production process after switching, based on a process condition used before the switching.

10 Claims, 14 Drawing Sheets

(56) References Cited

U.S. PATENT DOCUMENTS

| 10,611,085 | B1 * | 4/2020 | Janson | B22F 10/70 |
| 11,097,484 | B1 * | 8/2021 | Snyder | B29C 64/379 |
| 11,422,532 | B2 * | 8/2022 | Connor | B22F 10/18 |
| 11,491,718 | B2 * | 11/2022 | Sealy | B22F 10/25 |
| 11,565,468 | B1 * | 1/2023 | Snyder | B29C 64/106 |
| 2008/0286139 | A1 | 11/2008 | Abe et al. | |
| 2012/0225076 | A1 | 9/2012 | Peeper et al. | |
| 2013/0015596 | A1 | 1/2013 | Mozeika et al. | |
| 2014/0163717 | A1 * | 6/2014 | Das | C30B 13/28 |
| | | | | 700/119 |
| 2016/0144429 | A1 | 5/2016 | Mizutani | |
| 2017/0297323 | A1 | 10/2017 | Yamazaki et al. | |
| 2019/0361426 | A1 * | 11/2019 | Connor | B22F 10/85 |
| 2020/0096971 | A1 * | 3/2020 | Connor | B22F 10/50 |
| 2020/0166909 | A1 * | 5/2020 | Noone | G06N 20/00 |
| 2020/0264589 | A1 * | 8/2020 | Reinhart | G05B 19/41865 |
| 2021/0107108 | A1 | 4/2021 | Aizawa et al. | |
| 2021/0197491 | A1 * | 7/2021 | Hollander | B33Y 40/00 |
| 2022/0043430 | A1 * | 2/2022 | Iriguchi | G05B 19/41865 |
| 2022/0342385 | A1 * | 10/2022 | Connor | B22F 10/85 |
| 2022/0379380 | A1 * | 12/2022 | Sanders | B22F 10/00 |
| 2023/0101500 | A1 * | 3/2023 | Iriguchi | B22F 10/22 |
| | | | | 700/119 |
| 2023/0251626 | A1 * | 8/2023 | Connor | G05B 19/4099 |
| | | | | 700/98 |

FOREIGN PATENT DOCUMENTS

| JP | 2006-124733 | A | 5/2006 |
| JP | 2008-307895 | A | 12/2008 |
| JP | 2013-006269 | A | 1/2013 |
| JP | 2016-009351 | A | 1/2016 |
| JP | 2016-98411 | A | 5/2016 |
| JP | 2016-127833 | A | 7/2016 |
| JP | 2017-194942 | A | 10/2017 |
| JP | 2018-176582 | A | 11/2018 |
| JP | 6626788 | B2 | 12/2019 |
| JP | 2021-64128 | A | 4/2021 |

OTHER PUBLICATIONS

Rahman et al., "Review of Intelligence for Additive and Subtractive Manufacturing: Current Status and Future Prospect", Dec. 2022, Micromachines 2023, 14, 508. (Year: 2022).*

Osman et al., "Optimal Process Planning for Hybrid Additive and Subtractive Manufacturing", Jul. 2021, Journal of Manufacturing Science and Engineering Jun. 2023, vol. 145. (Year: 2021).*

Grzesik, W., "Hybrid Additive and Subtractive Manufacturing Processes and Systems: A Review", Feb. 2018, Journal of Machine Engineering, 2018, vol. 18, No. 4, 5-24. (Year: 2018).*

Liu et al., "Topology optimization for hybrid additive-subtractive manufacturing", Apr. 2016, Struct Multidisc Optim (2017) 55:1281-1299. (Year: 2016).*

Li et al., "A novel 6-axis hybrid additive-subtractive manufacturing process: Design and case studies", Sep. 2017, Journal of Manufacturing Processes 33 (2018) 150-160. (Year: 2017).*

Flynn et al., "Hybrid additive and subtractive machine tools—Research and industrial developments", Jun. 2015, International JournalofMachineTools&Manufacture 101(2016)79-101.(Year: 2015).*

Bai et al., "Adaptive Process Planning for Additive/Subtractive Hybrid Manufacturing of Overhang Features", Oct. 2021, Journal of Manufacturing Science and Engineering Feb. 2023, vol. 145. (Year: 2021).*

Chen et al., "Process planning for hybrid additive and subtractive manufacturing to integrate machining and directed energy deposition", 2019, Procedia Manufacturing 34, 205-213. (Year: 2019).*

International Search Report and Written Opinion mailed on Jul. 20, 2021, received for PCT Application PCT/JP2021/017515, filed on May 7, 2021, 11 pages including English Translation.

Office Action issued Aug. 20, 2024 in corresponding Japanese Patent Application No. 2023-518588, 11pp.

Office Action mailed on Mar. 23, 2026 for the corresponding Chinese patent application No. 202180097031.1 and an English machine translation thereof, 19pp.

* cited by examiner

FIG.4

| INSUFFICIENT WELDING VOLUME STATE | BALANCED WELDING VOLUME STATE | EXCESSIVE WELDING VOLUME STATE |
|---|---|---|
| | | |
| | | |

Figure 5:
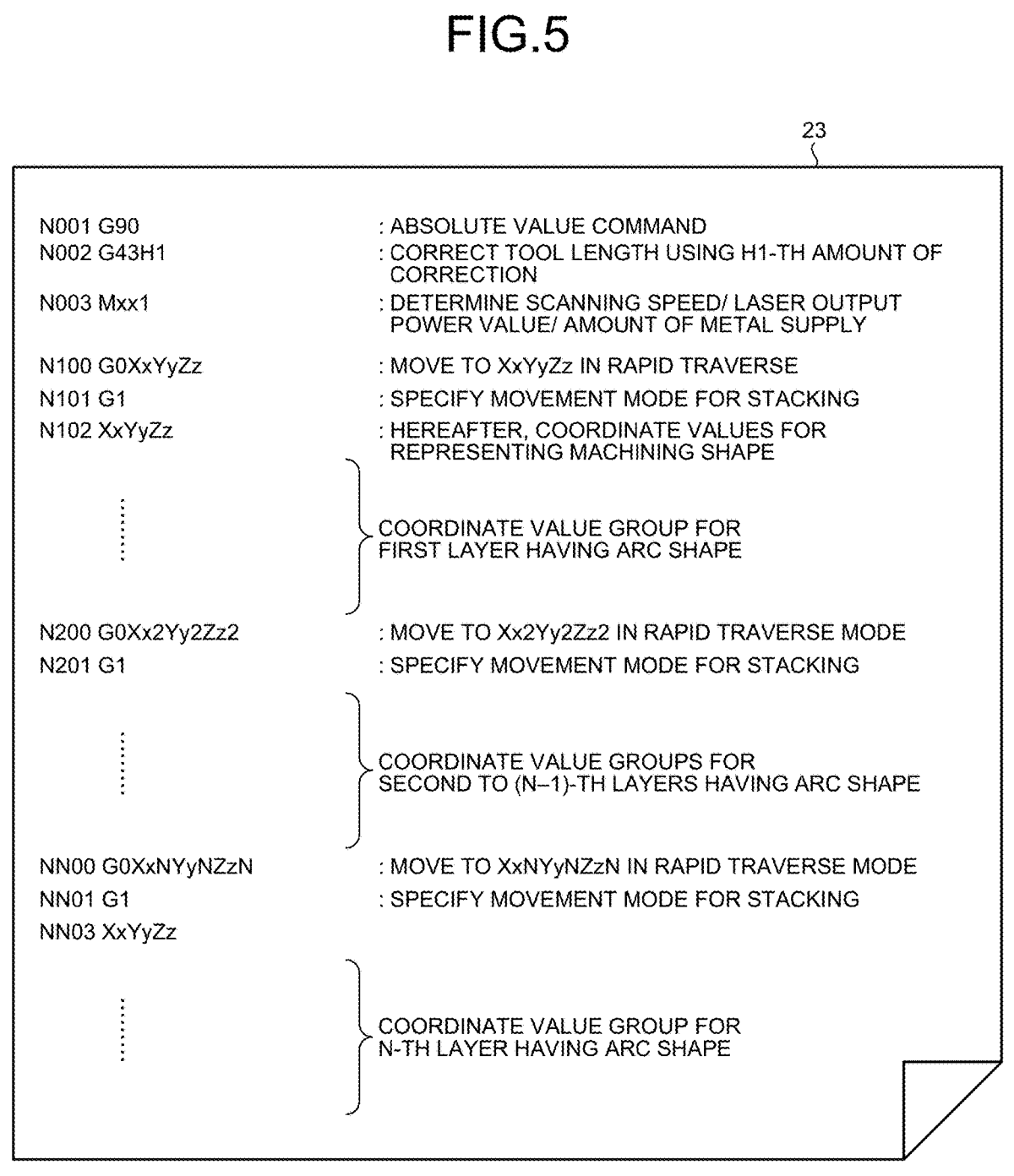

N001 G90                : ABSOLUTE VALUE COMMAND
N002 G43H1           : CORRECT TOOL LENGTH USING H1-TH AMOUNT OF
                                    CORRECTION
N003 Mxx1            : DETERMINE SCANNING SPEED/ LASER OUTPUT
                                    POWER VALUE/ AMOUNT OF METAL SUPPLY

N100 G0XxYyZz       : MOVE TO XxYyZz IN RAPID TRAVERSE
N101 G1                : SPECIFY MOVEMENT MODE FOR STACKING
N102 XxYyZz         : HEREAFTER, COORDINATE VALUES FOR
                                    REPRESENTING MACHINING SHAPE

COORDINATE VALUE GROUP FOR
                                    FIRST LAYER HAVING ARC SHAPE

N200 G0Xx2Yy2Zz2    : MOVE TO Xx2Yy2Zz2 IN RAPID TRAVERSE MODE
N201 G1               : SPECIFY MOVEMENT MODE FOR STACKING

COORDINATE VALUE GROUPS FOR
                                    SECOND TO (N−1)-TH LAYERS HAVING ARC SHAPE

NN00 G0XxNYyNZzN   : MOVE TO XxNYyNZzN IN RAPID TRAVERSE MODE
NN01 G1              : SPECIFY MOVEMENT MODE FOR STACKING
NN03 XxYyZz

COORDINATE VALUE GROUP FOR
                                    N-TH LAYER HAVING ARC SHAPE

FIG.14

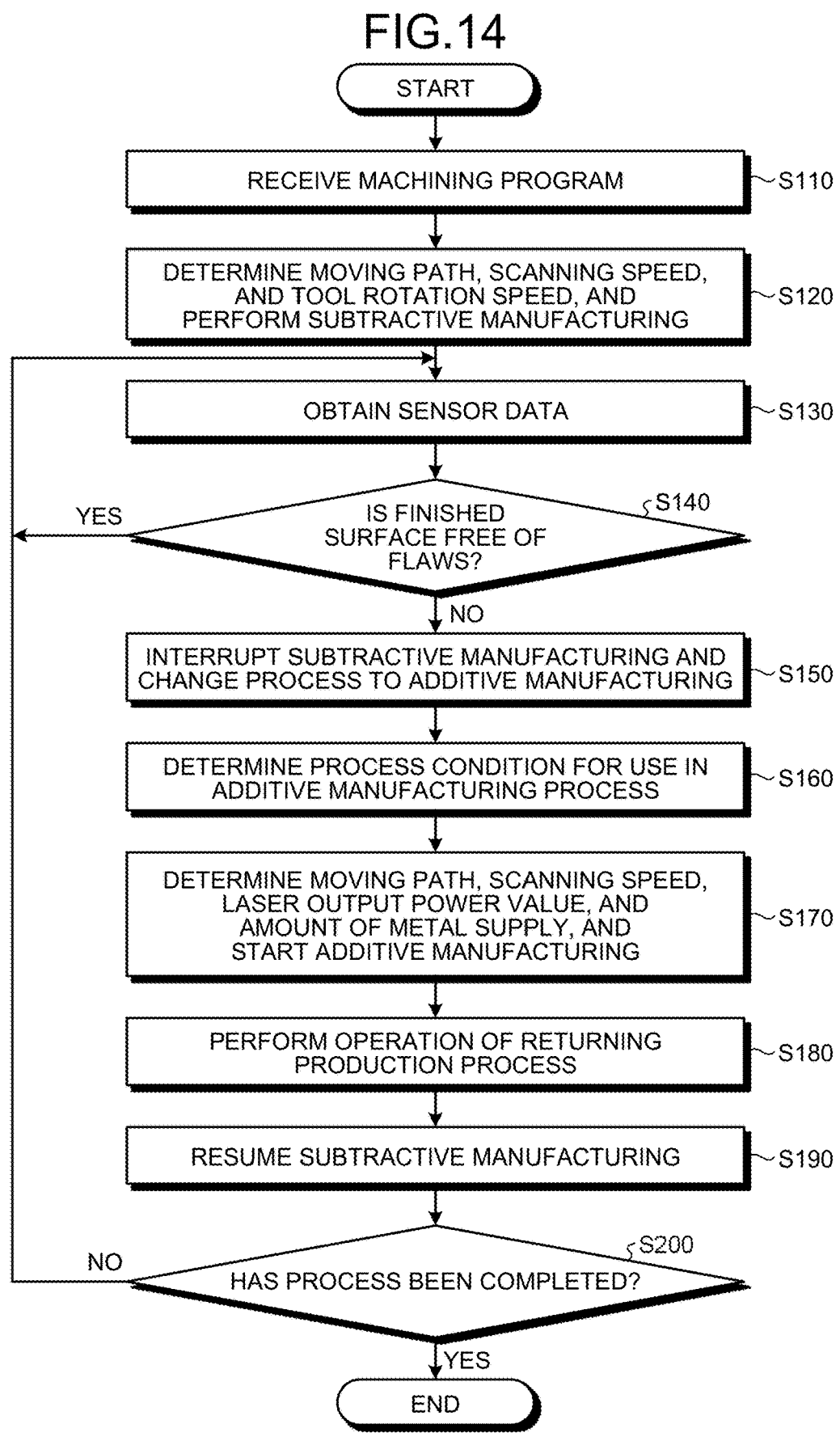

START

RECEIVE MACHINING PROGRAM ~S110

DETERMINE MOVING PATH, SCANNING SPEED, AND TOOL ROTATION SPEED, AND PERFORM SUBTRACTIVE MANUFACTURING ~S120

OBTAIN SENSOR DATA ~S130

IS FINISHED SURFACE FREE OF FLAWS? S140 — YES

NO

INTERRUPT SUBTRACTIVE MANUFACTURING AND CHANGE PROCESS TO ADDITIVE MANUFACTURING ~S150

DETERMINE PROCESS CONDITION FOR USE IN ADDITIVE MANUFACTURING PROCESS ~S160

DETERMINE MOVING PATH, SCANNING SPEED, LASER OUTPUT POWER VALUE, AND AMOUNT OF METAL SUPPLY, AND START ADDITIVE MANUFACTURING ~S170

PERFORM OPERATION OF RETURNING PRODUCTION PROCESS ~S180

RESUME SUBTRACTIVE MANUFACTURING ~S190

HAS PROCESS BEEN COMPLETED? S200 — NO

YES

END

NUMERICAL CONTROL DEVICE AND NUMERICAL CONTROL METHOD

CROSS-REFERENCE TO RELATED APPLICATION

This application is based on PCT filing PCT/JP2021/017515, filed May 7, 2021, the entire contents of which are incorporated herein by reference.

FIELD

The present disclosure relates to a numerical control device and a numerical control method for controlling an additive manufacturing machine and a subtractive manufacturing machine.

BACKGROUND

An additive manufacturing machine is a known technology for producing a shaped object having a three-dimensional shape using a directed energy deposition (DED) technique. One type of additive manufacturing machines is a machine that locally melts a material using a beam emitted from a machining head, and adds the melted material onto a workpiece. An additive manufacturing machine is capable of producing complex shapes such as a hollow structure and an integrally formed article, but has a low shaping precision which requires a process for removing unwanted portions using a cutting manufacturing machine. A cutting manufacturing machine is a machine that produces a desired shape by cutting a workpiece using various types of cutting tools such as a drill and a milling cutter attached to the machining head. A cutting manufacturing machine is capable of producing a shaped object with higher precision than the precision obtainable by additive manufacturing.

When a numerical control device controls an additive manufacturing machine and a cutting manufacturing machine, the machining program to be input to the numerical control device is generally generated by a computer-aided manufacturing (CAM) device. The numerical control device calculates a moving path for moving the machining head through analysis of the machining program, and generates a position command including a group of interpolated points at every unit time on the moving path. The numerical control device controls an operating mechanism included in each of the additive manufacturing machine and the cutting manufacturing machine according to the position command. The numerical control device also generates a command that meets process requirements specified by the machining program.

With respect to the additive manufacturing machine, the numerical control device controls the beam source by generating a command that meets beam output requirements. Also, with respect to the additive manufacturing machine, the numerical control device controls the supply source of material such as a metal powder or a metal wire by generating a command that meets a requirement of the amount of supply of the material. In additive manufacturing, emission of a beam onto the material and onto the workpiece causes part of the workpiece to be melted, and a molten pool to be generated in which the melted material is pooled, on the workpiece. The melted material is supplied to the molten pool, after which the material solidifies, thereby causing a layer formed of solidified melted material to be formed on the workpiece.

In addition, with respect to the cutting manufacturing machine, the numerical control device controls the edge of the cutting tool by generating a command that meets a requirement of the rotational speed of the tool. The cutting manufacturing machine physically cuts into the workpiece by the edge of the cutting tool, and cuts out and removes a part of the workpiece as chips, thereby forming a cutting-machined surface.

The control data generation method described in Patent Literature 1 determines a cutting path for cutting, by a tool, a shape that will be generated using an additive manufacturing technique, and a path of the nozzle that supplies the material to cause the path to temporally track back the cutting path.

CITATION LIST

Patent Literature

Patent Literature 1: Japanese Patent No. 6626788

SUMMARY OF INVENTION

Problem to be Solved by the Invention

However, the technology of above Patent Literature 1 switches the process between the cutting process and the additive manufacturing process at a time determined in advance using a CAM technology based on expertise of the user without taking into account the welding status of the metal material or the heat accumulation condition of the machined portion in the additive manufacturing process. Thus, even when the shaped object undergoes strain or misshaping depending on the welding status or the heat accumulation condition, the technology of above Patent Literature 1 is not capable of interrupting the additive manufacturing process, but continues the additive manufacturing process with the strain or the misshaping remaining on the shaped object. This presents a problem in the technology of above Patent Literature 1 in incapability of accurately producing a desired shaped object.

The present disclosure has been made in view of the foregoing, and it is an object of the present disclosure to provide a numerical control device capable of accurately producing a desired shaped object.

Means to Solve the Problem

To solve the problem and achieve the object described above, a numerical control device of the present disclosure includes an additive manufacturing execution unit that controls an additive manufacturing machine that performs an additive manufacturing process in which a shaped object is produced by stacking layers of a material melted by emission of a beam from a first machining head, and a subtractive manufacturing execution unit that controls a subtractive manufacturing machine that performs a subtractive manufacturing process in which the shaped object is cut using a tool disposed on a second machining head. The numerical control device of the present disclosure also includes a status analysis unit that receives sensor data obtained by monitoring of a machining status of the shaped object, and analyzes the machining status of the shaped object based on the sensor data, where the shaped object is produced by a combination of two production processes that are the additive manufacturing process and the subtractive manufacturing process, and a production process change unit that generates a switching command that commands switching with respect to which of the two production processes is to be performed, based on a result of analysis of the machining status, and outputs the switching command to the additive manufacturing execution unit and to the subtractive manufacturing execution unit. The numerical control device of the present disclosure further includes a process condition generation unit that determines, upon switching between the two production processes, a second process condition to be used in a second production process based on a first process condition that has been used in a first production process, where the first production process is a production process performed before the switching, of the two production processes, and the second production process is a production process to be performed after the switching, of the two production processes.

Effects of the Invention

A numerical control device according to the present disclosure is advantageous in capability of accurately producing a desired shaped object.

BRIEF DESCRIPTION OF DRAWINGS

FIG. 4 is a diagram for describing welding states during shaping performed by the additive manufacturing machine illustrated in FIG. 1.

FIG. 5 is a diagram illustrating an example of machining program used by the NC device according to the first embodiment.

FIG. 14 is a flowchart illustrating a procedure of operation performed by the NC device according to the second embodiment.

DESCRIPTION OF EMBODIMENTS

A numerical control device and a numerical control method according to embodiments of the present disclosure will be described in detail below with reference to the drawings. Note that the numerical control device is hereinafter referred to as numerical control (NC) device.

First Embodiment

Figure 1:
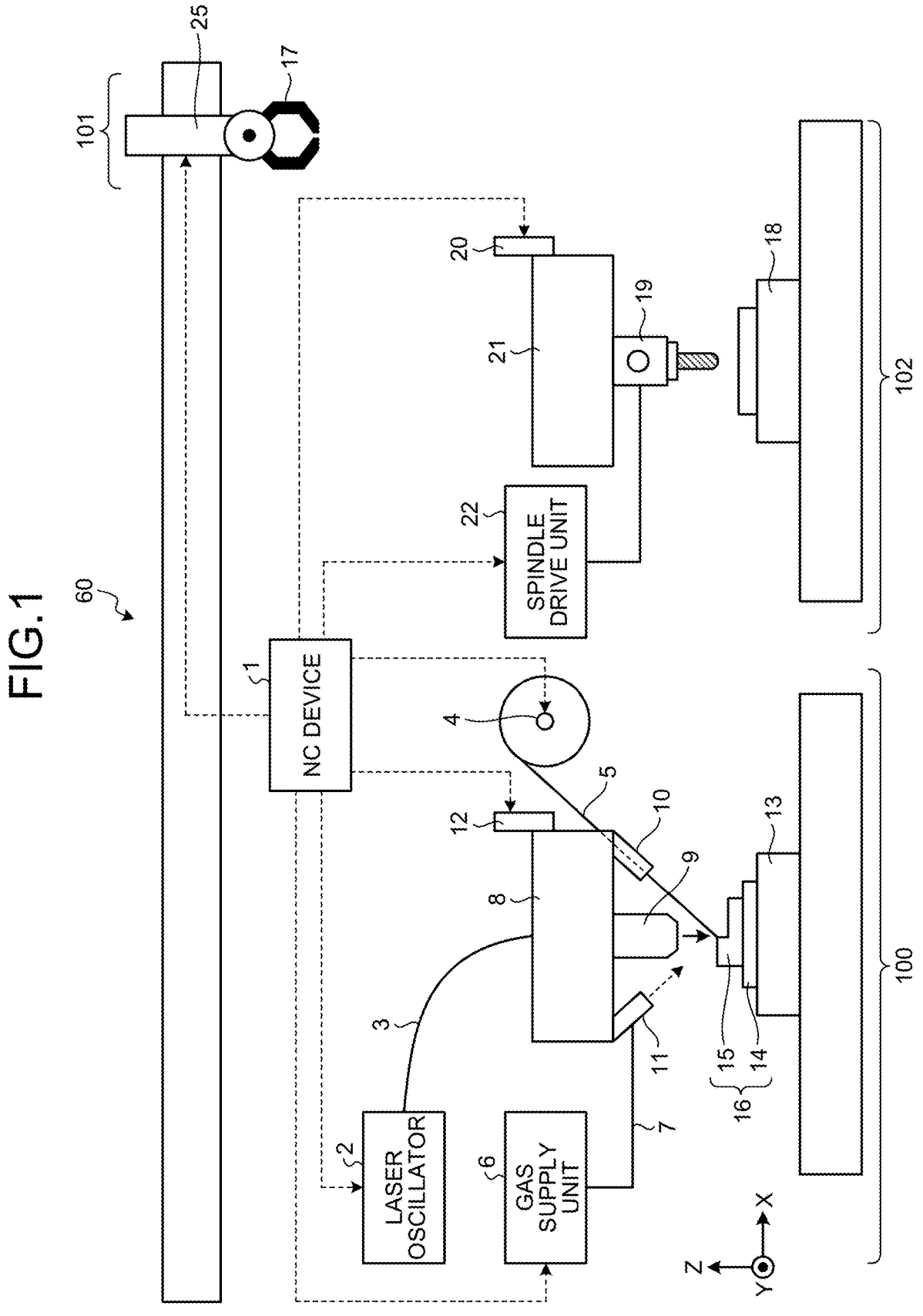
FIG. 1 is a diagram illustrating an additive manufacturing machine and a subtractive manufacturing machine controlled by an NC device according to a first embodiment.

FIG. 1 is a diagram illustrating an additive manufacturing machine and a subtractive manufacturing machine controlled by an NC device according to a first embodiment. A machining system 60 is a system for manufacturing a shaped object 15, which is a three-dimensional shaped object. The machining system 60 includes an additive manufacturing machine 100, a subtractive manufacturing machine 102, an NC device 1, and an automated transportation unit 101.

The additive manufacturing machine 100 is an additive machine that produces the shaped object 15 having a three-dimensional shape using a directed energy deposition technique. The additive manufacturing machine 100 is a machine tool that adds a material 5 melted by a beam emitted from a machining head 8 onto a workpiece 16 to produce the shaped object 15. The additive manufacturing machine 100 includes a laser oscillator 2, a gas supply unit 6, the machining head 8, a head drive unit 12, a material supply unit 4, and a stage 13.

The subtractive manufacturing machine 102, which is a subtractive manufacturing machine, is a machine tool that removes a part of the shaped object 15 to shape the shaped object 15 into a desired shape. One example of the subtractive manufacturing machine 102 is a cutting manufacturing machine. The subtractive manufacturing machine 102 includes a spindle drive unit 22, a machining head 21, a head drive unit 20, and a stage 18. The machining head 8 is a first machining head, and the machining head 21 is a second machining head.

In the first embodiment, the beam used by the additive manufacturing machine 100 is a laser beam, and the material 5 is a metal material such as a metal wire. The material 5 for use in the additive manufacturing machine 100 is not limited to a metal wire, but may be a metal powder.

The additive manufacturing machine 100 stacks up layers each formed by solidification of the material 5 that was melted (hereinafter, melted material 5) thus to form the shaped object 15 on the surface of a base substrate 14. The base substrate 14 is placed on the stage 13. In the following description, the workpiece 16 is an object on which the melted material 5 is added, and refers to the combination of the base substrate 14 and the shaped object 15. The base substrate 14 illustrated in FIG. 1 is a plate material. Note that the base substrate 14 may be other than a plate material.

The machining head 8 of the additive manufacturing machine 100 is moved relative to the workpiece 16. The machining head 8 includes a beam nozzle 9, a material nozzle 10, and a gas nozzle 11. The beam nozzle 9 emits a laser beam toward the workpiece 16. The material nozzle 10 advances the material 5 toward the position of laser beam irradiation on the workpiece 16. The gas nozzle 11 sprays gas toward the workpiece 16. The additive manufacturing machine 100 sprays gas to prevent oxidation of the shaped object 15 and to cool the layer generated on the workpiece 16.

The laser oscillator 2, which is a beam source, oscillates a laser beam. The laser beam from the laser oscillator 2 is propagated through a fiber cable 3, which is an optical transmission line, to the beam nozzle 9. The gas supply unit 6 supplies gas through a pipe 7 to the gas nozzle 11.

The material supply unit 4 is a supply source of the material 5. The material supply unit 4 includes a drive unit for feeding the material 5, which is a metal wire. The material 5 fed from the material supply unit 4 is supplied through the material nozzle 10 to the position of laser beam irradiation.

The head drive unit 12 includes servomotors forming an operating mechanism for moving the machining head 8. The head drive unit 12 moves the machining head 8 along each direction of an X-axis direction, a Y-axis direction, and a Z-axis direction. The X-axis, the Y-axis, and the Z-axis are three axes perpendicular to each other. The X-axis and the Y-axis are axes parallel to horizontal directions. The Z-axis direction is a vertical direction. FIG. 1 omits illustration of the servomotors included in the head drive unit 12. In the additive manufacturing machine 100, the head drive unit 12 moves the machining head 8, thereby moves the position of laser beam irradiation on the workpiece 16.

The additive manufacturing machine 100 moves the machining head 8 relative to the workpiece 16, thereby moves the position of laser beam irradiation on the workpiece 16. Note that the additive manufacturing machine 100 may move the position of laser beam irradiation on the workpiece 16 by moving the workpiece 16 relative to the machining head 8. Note that the position of laser beam irradiation may be hereinafter referred to simply as "irradiation position".

The NC device 1 controls the additive manufacturing machine 100 according to the machining program. The NC device 1 outputs a position command to the head drive unit 12, thereby controls the position of the machining head 8 driven by the head drive unit 12. The NC device 1 outputs an output command that is a command according to beam output requirements, to the laser oscillator 2, thereby controls laser oscillation provided by the laser oscillator 2.

The NC device 1 outputs a supply command, which is a command according to a requirement of the amount of supply of the material 5 (which may be hereinafter referred to as amount of metal supply), to the material supply unit 4, thereby controls the material supply unit 4. When the material 5 is a metal wire, the supply command output by the NC device 1 may be a command according to a requirement of the speed of supply of the material 5. The speed of supply is the speed of the material 5 moving from the material supply unit 4 to the irradiation position. The speed of supply represents the amount of supply of the material 5 per unit time.

The NC device 1 outputs a command according to a requirement of the amount of supply of the gas, to the gas supply unit 6, thereby controls the amount of the gas to be supplied from the gas supply unit 6 to the gas nozzle 11. Note that the NC device 1 may be one of components of the additive manufacturing machine 100, or a device external to the additive manufacturing machine 100.

The automated transportation unit 101 removes the shaped object 15 from the stage 13 of the additive manufacturing machine 100, and places the shaped object 15 on the stage 18 of the subtractive manufacturing machine 102. In addition, the automated transportation unit 101 removes the shaped object 15 from the stage 18 of the subtractive manufacturing machine 102, and places the shaped object 15 on the stage 13 of the additive manufacturing machine 100.

The automated transportation unit 101 includes a hand drive unit 25 and a hand mechanism 17. The hand drive unit 25 includes servomotors implementing an operating mechanism for allowing the hand mechanism 17 to grip the shaped object 15 and moving the shaped object 15 along each direction of the X-axis direction, the Y-axis direction, and the Z-axis direction, in which the shaped object 15 is fixed on a jig (not illustrated) with the base substrate 14 interposed therebetween. Note that FIG. 1 omits illustration of the servomotors. The NC device 1 outputs a move command to the automated transportation unit 101 to control the positions of the hand drive unit 25 and of the hand mechanism 17. Note that the NC device 1 may be one of components of the automated transportation unit 101, or a device external to the automated transportation unit 101.

The subtractive manufacturing machine 102 presses a tool 19, which is being rotated, onto the shaped object 15, and cuts off a part of the shaped object 15 to shape the shaped object 15 into a desired shape. The head drive unit 20 includes servomotors implementing an operating mechanism for moving the machining head 21. The head drive unit 20 moves the machining head 21 along each direction of the X-axis direction, the Y-axis direction, and the Z-axis direction. FIG. 1 omits illustration of the servomotors included in the head drive unit 20.

In the subtractive manufacturing machine 102, the head drive unit 20 moves the machining head 21, thereby moves the tip position of the tool 19 relative to the workpiece 16. The spindle drive unit 22 may be disposed inside the machining head 21 or outside the machining head 21. The spindle drive unit 22 includes servomotors implementing an operating mechanism for rotating the tool 19. FIG. 1 omits illustration of the servomotors included in the spindle drive unit 22.

In the subtractive manufacturing machine 102, the spindle drive unit 22 rotates the tool 19, thereby cuts off unwanted parts of the shaped object 15 that has been formed by additive manufacturing. The subtractive manufacturing machine 102 moves the machining head 21 relative to the workpiece 16, thereby moves the tip position of the tool 19 relative to the workpiece 16. Note that the subtractive manufacturing machine 102 may move the tip position of the tool 19 relative to the workpiece 16 by moving the workpiece 16 relative to the machining head 21. In addition, the subtractive manufacturing machine 102 may rotate the workpiece 16 rather than the tool 19. When the subtractive manufacturing machine 102 rotates the tool 19, the rotational shaft of the tool 19 will be the spindle, while when the subtractive manufacturing machine 102 rotates the workpiece 16, the rotational shaft of the workpiece 16 will be the spindle.

The NC device 1 controls the subtractive manufacturing machine 102 according to the machining program. The NC device 1 outputs a position command to the head drive unit 20, thereby controls the position of the machining head 21 driven by the head drive unit 20. The NC device 1 outputs, to the spindle drive unit 22, an output command that is a command according to a requirement of the tool rotation speed (spindle rotation speed) that has been set in the machining program, thereby controls the tool rotation speed. The tool rotation speed is the number of revolutions of the tool 19 per unit time.

Note that the NC device 1 may be one of components of the subtractive manufacturing machine 102, or a device external to the subtractive manufacturing machine 102.

In addition, although the first embodiment is described in which the additive manufacturing machine 100 and the subtractive manufacturing machine 102 are separate components, the additive manufacturing machine 100 and the subtractive manufacturing machine 102 may together be a composite manufacturing machine having both an additive manufacturing capability and a subtractive manufacturing capability.

Figure 2:
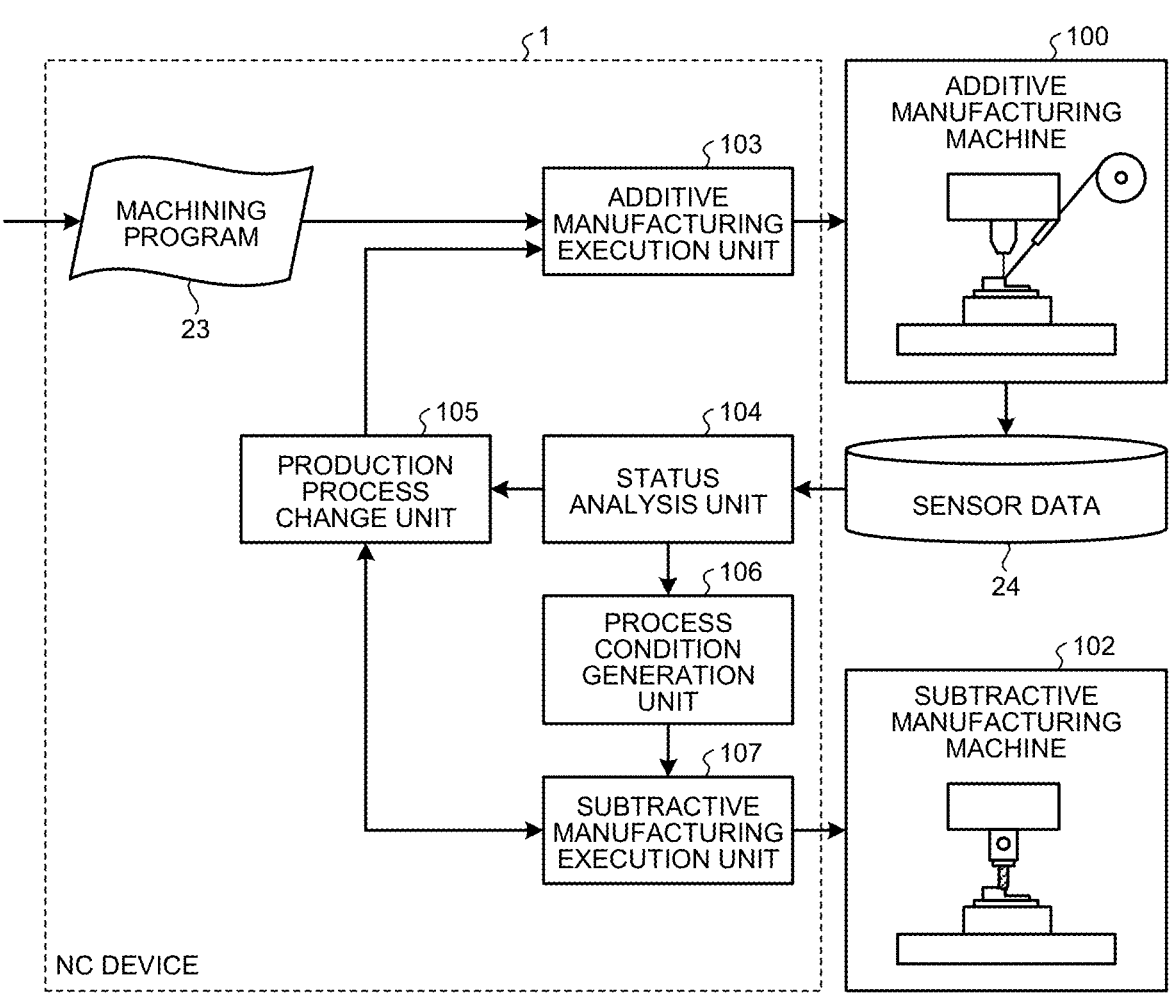
FIG. 2 is a diagram illustrating a functional configuration of the NC device according to the first embodiment.

FIG. 2 is a diagram illustrating a functional configuration of the NC device according to the first embodiment. The NC device 1 includes an additive manufacturing execution unit 103, a status analysis unit 104, a production process change unit 105, a process condition generation unit 106, and a subtractive manufacturing execution unit 107.

The additive manufacturing execution unit 103 receives a machining program 23 which is input from outside. The machining program 23 is a program for use in producing the shaped object 15 by melting the material 5 using a beam emitted from the machining head 8 and adding the melted material 5 onto the workpiece 16.

The machining program 23 includes a description of: a move command and a speed command needed for moving the workpiece 16 or the machining head 8 along a preset path; an output command with respect to the laser beam needed for performing additive manufacturing (laminate shaping) with a desired stack height and a desired stack width; and a supply command with respect to the metal powder or the metal wire. The stack height and the stack width are a stack height and a stack width of one layer. The move command is represented by a move command value. The speed command is represented by a speed command value. The output command is represented by an output command value. The supply command is represented by a supply amount command value. Note that supply of the metal powder or of the metal wire may be hereinafter referred to as metal supply.

The move command and the speed command used in the additive manufacturing execution unit 103 are commands that specify a relative position and a relative speed between the workpiece 16 and the machining head 8. The position and the speed of the machining head 8 used in the additive manufacturing execution unit 103 are accordingly the relative position and the relative speed between the workpiece 16 and the machining head 8. The following description describes a case in which the machining head 8 is controlled, while control is provided on the relative position and the relative speed between the workpiece 16 and the machining head 8.

The additive manufacturing execution unit 103 also receives a switching command with respect to the production process, from the production process change unit 105. The switching command with respect to the production process is a switching command to provide switching from an additive manufacturing process (additive machining process) to a subtractive manufacturing process (subtractive machining process), or a switching command to provide switching from a subtractive manufacturing process to an additive manufacturing process.

The additive manufacturing execution unit 103 controls, based on the machining program 23, the moving path of the head position of the machining head 8 (hereinafter referred to as head movement path HR8), and the output power value of the laser beam and the amount of supply of the material 5 (i.e., amount of metal supply) on the head movement path HR8. The head movement path HR8 is the machining path to be used by the machining head 8. Thus, the additive manufacturing execution unit 103 causes the additive manufacturing machine 100 to perform additive manufacturing on the shaped object 15.

The additive manufacturing execution unit 103 stops the additive manufacturing process when a switching command is received for switching the production process from the additive manufacturing process to the subtractive manufacturing process. The additive manufacturing execution unit 103 resumes the additive manufacturing process when a switching command is received for switching the production process from the subtractive manufacturing process to the additive manufacturing process.

The status analysis unit 104 receives sensor data 24 obtained from the additive manufacturing machine 100. The status analysis unit 104 analyzes the machining status of the shaped object 15 based on the sensor data 24. The sensor data 24 includes image data, temperature data, and molten pool data, which are described later.

The status analysis unit 104 sends the machining status, which is an analysis result, to the production process change unit 105 and to the process condition generation unit 106. The machining status sent by the status analysis unit 104 to the process condition generation unit 106 includes a result of determination of whether stable shaping machining can be continued.

The sensor data 24 obtained from the additive manufacturing machine 100 may be stored in a storage device or the like. In this case, the storage device may be disposed inside the NC device 1 or outside the NC device 1. In addition, the storage device may be disposed inside the additive manufacturing machine 100 or outside the additive manufacturing machine 100.

The production process change unit 105 automatically changes the production process between the additive manufacturing process and the subtractive manufacturing process according to the machining status of the shaped object 15. The production process change unit 105 changes the production process from the additive manufacturing process to the subtractive manufacturing process when the status analysis unit 104 has determined that stable shaping machining cannot be continued. In addition, the production process change unit 105 changes the production process from the subtractive manufacturing process to the additive manufacturing process when a notification is received from the subtractive manufacturing execution unit 107 indicating that the subtractive manufacturing process has been completed.

The production process change unit 105 sends, to the additive manufacturing execution unit 103, the switching command to provide switching from the additive manufacturing process to the subtractive manufacturing process and the switching command to provide switching from the subtractive manufacturing process to the additive manufacturing process. The production process change unit 105 also sends the switching command to provide switching from the additive manufacturing process to the subtractive manufacturing process, to the subtractive manufacturing execution unit 107. The production process change unit 105 further sends a transport command with respect to the shaped object 15 to the automated transportation unit 101 when a switching command is sent to the additive manufacturing execution unit 103 or to the subtractive manufacturing execution unit 107.

The process condition generation unit 106 receives the machining status from the status analysis unit 104. When the status analysis unit 104 has determined that stable shaping machining cannot be continued, the process condition generation unit 106 calculates process conditions to be used by the subtractive manufacturing machine 102 after the change of the production process. In this case, the process condition generation unit 106 calculates the process conditions to be used by the subtractive manufacturing machine 102 after the change of the production process, based on the process conditions used by the additive manufacturing machine 100 before the change of the production process and based on the machining status.

The process conditions used before the change of the production process include the head movement path HR8 and the like. The process condition generation unit 106 may obtain the process conditions used before the change of the production process, from the additive manufacturing execution unit 103, or may calculate the process conditions used before the change of the production process, based on the machining program 23. The process condition generation unit 106 sends the process conditions calculated, to the subtractive manufacturing execution unit 107. The process conditions calculated by the process condition generation unit 106 include the moving path of the head position of the machining head 21 (hereinafter referred to as head movement path HR21) and the like. The head movement path HR21 is the machining path to be used by the machining head 21.

The subtractive manufacturing execution unit 107 receives a switching command with respect to the production process, from the production process change unit 105. The subtractive manufacturing execution unit 107 also receives the process conditions from the process condition generation unit 106. The subtractive manufacturing execution unit 107 controls the head movement path HR21 and the tool rotation speed on the head movement path HR21 based on the process conditions received from the process condition generation unit 106. Thus, the subtractive manufacturing execution unit 107 causes the subtractive manufacturing machine 102 to remove a part of the shaped object 15 by subtractive manufacturing.

The move command and the speed command used in the subtractive manufacturing execution unit 107 are commands that specify a relative position and a relative speed between the workpiece 16 and the machining head 21. The position and the speed of the machining head 21 used in the subtractive manufacturing execution unit 107 are accordingly the relative position and the relative speed between the workpiece 16 and the machining head 21. The following description describes a case in which the machining head 21 is controlled, while control is provided on the relative position and the relative speed between the workpiece 16 and the machining head 21.

Figure 3:
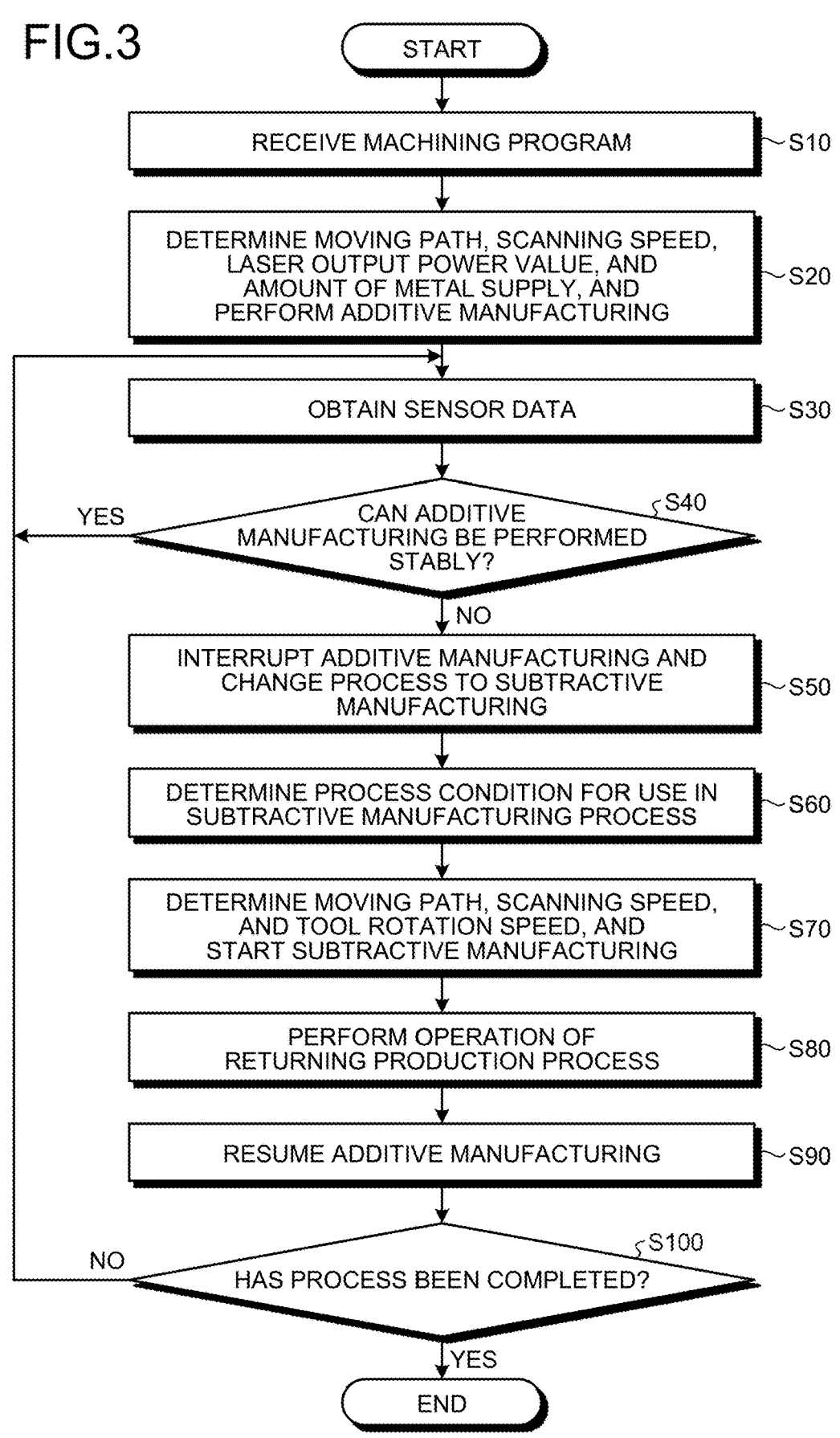
FIG. 3 is a flowchart illustrating a procedure of operation performed by the NC device according to the first embodiment.

An example of operation of the NC device 1 will next be described. FIG. 3 is a flowchart illustrating a procedure of operation performed by the NC device according to the first embodiment.

(Step S10)

At step S10, the machining program 23 is externally input to the additive manufacturing execution unit 103. This causes the additive manufacturing execution unit 103 to receive the machining program 23. As described above, the machining program 23 includes an output command with respect to the laser beam and a supply command with respect to the metal powder or the metal wire. The machining program 23 also includes a move command for controlling the relative position between the workpiece 16 and the machining head 8, and a speed command for controlling the relative speed between the workpiece 16 and the machining head 8. The speed command with respect to the machining head 8 is a command with respect to the scanning speed at the laser irradiation position.

The move command with respect to the machining head 8 specifies move command details using coordinate values and a G code (e.g., G0, G1, or the like) representing the movement mode at these coordinate values. In addition, the speed command with respect to the machining head 8 commands speed command details using an F code in which speed value is described.

Performing additive manufacturing (laminate shaping) requires a desired stack height and a desired stack width that have been set by a user, an output command value of the laser beam under these conditions, and a supply amount command value of the metal powder or of the metal wire under these conditions. That is, performing additive manufacturing (laminate shaping) requires an output command value of the laser beam and a supply amount command value of the metal supply, which are corresponding to the desired stack height and to the desired stack width. The additive manufacturing machine 100 stores at least one or more blocks of data, where each block of data is information including the stack height and the stack width, the output power value of the laser beam, the amount of metal supply, and the scanning speed (moving speed) of the machining head 8, associated with one another. These blocks of data are hereinafter referred to as stacking condition data. In the first embodiment, the stack width extends in the X-axis direction, and the stack height extends in the Z-axis direction.

The machining program 23 includes an output command value of the laser beam and a supply amount command value of the metal supply each specified using a G code or an M code based on the stacking condition data to achieve a desired stack height and a desired stack width. That is, the machining program 23 specifies the information included in the stacking condition data using a G code, an M code, or the like.

Note that the output command value of the laser beam and the supply amount command value of the metal supply may be directly described in the machining program 23 to achieve a desired stack height and a desired stack width. The NC device 1 advances the procedure to step S20 after performing step S10.

(Step S20)

At step S20, the additive manufacturing execution unit 103 analyzes the moving path for moving the machining head 8 in the additive manufacturing machine 100, based on process details described in the machining program 23 which is input from outside, and determines the moving path. The additive manufacturing execution unit 103 also determines the scanning speed, which is the moving speed of the machining head 8, based on the machining program 23. The additive manufacturing execution unit 103 further determines, based on the machining program 23, the laser output power value and the amount of metal supply required for the additive manufacturing process. Then, the additive manufacturing execution unit 103 causes the additive manufacturing machine 100 to perform additive manufacturing using the moving path, the scanning speed, the laser output power value, and the amount of metal supply that have been determined. The NC device 1 advances the procedure to step S30 after performing step S20.

(Step S30)

At step S30, the sensor data 24 for monitoring the machining status of the additive manufacturing machine 100 is collected from the additive manufacturing machine 100, and is input to the status analysis unit 104. This causes the status analysis unit 104 to obtain the sensor data 24.

The sensor data 24, which is sensor information, includes, for example, image data for measuring (or analyzing) the actual stack height and the actual stack width, temperature data for measuring (or analyzing) the heat accumulation condition of the shaped object 15, and molten pool data for measuring (or analyzing) the welding status of the metal powder or the metal wire. The image data is data representing an image of the shaped object 15, and is obtained using at least one of a camera and a laser displacement meter. The temperature data is data representing the temperature of the shaped object 15, and is obtained using at least one of a radiation thermometer and an infrared thermography unit. The molten pool data is data representing information about the molten pool, and is obtained using at least one of a camera or a motor detector included in the material supply unit 4. The motor detector included in the material supply unit 4 is a device for detecting a load torque exerted on the material supply unit 4. The molten pool data is thus obtained using at least one of data of an image captured by a camera and a load torque detected by the motor detector.

Note that the welding status of the metal powder or the metal wire is classified into three states, which are an insufficient welding volume state, a balanced welding volume state, and an excessive welding volume state. FIG. 4 is a diagram for describing the welding states during shaping performed by the additive manufacturing machine illustrated in FIG. 1.

FIG. 4 illustrates an example of shape of bead for each of the three welding states, which are the insufficient welding volume state, the balanced welding volume state, and the excessive welding volume state. The shape of bead is a three-dimensional shape of one layer of the shaped object 15.

The upper stage of FIG. 4 illustrates the shapes of bead when the stack shapes in the three welding states are viewed from the Y-direction, which is the laser beam scanning direction. The lower stage of FIG. 4 illustrates the shapes of bead when the stack shapes in the three welding states are viewed from the Z-direction, which is the laser beam emission direction.

In FIG. 4, the insufficient welding volume state is a state in which the metal material is merely partially welded due to an insufficient volume of the welding material, thereby resulting in failure in formation of a layer having an intended shape. The balanced welding volume state is a state in which an appropriate volume of the welding material has resulted in formation of a layer having an intended shape. The excessive welding volume state is a state in which the material 5 used for welding has flowed around due to an excess volume of the welding material, thereby resulting in failure in formation of a layer having an intended shape. The excessive welding volume state corresponds to a shape flatter than the intended shape.

The shape in the insufficient welding volume state has a stack width less than the stack width of the shape in the balanced welding volume state. In addition, the shape in the insufficient welding volume state has a height greater than the height of the shape in the balanced welding volume state.

The shape in the excessive welding volume state has a stack width greater than the stack width of the shape in the balanced welding volume state. In addition, the shape in the excessive welding volume state has a height less than the height of the shape in the balanced welding volume state. The NC device 1 advances the procedure to step S40 after performing step S30.

(Step S40)

At step S40, the status analysis unit 104 determines whether additive shaping (additive manufacturing) can be performed stably, based on the image data, the temperature data, and the molten pool data included in the sensor data 24. That is, the status analysis unit 104 determines whether the additive manufacturing process in the additive manufacturing machine 100 can be stably continued.

The image data included in the sensor data 24 is data indicating whether additive manufacturing has been performed such that the bead produced by additive manufacturing is uniform and has no variation or error in height and in width. The temperature data included in the sensor data 24 is data indicating whether the time required for the melted material to solidify has increased due to a heat accumulation temperature of the shaped object 15. The molten pool data included in the sensor data 24 is data indicating whether the welding status of the metal powder or the metal wire has been successfully maintained in the balanced welding volume state.

The status analysis unit 104 analyzes in advance, based on the image data and on the temperature data, whether the time required for the melted material to solidify will increase due to an effect of heat accumulation, and whether strain or misshaping will occur in and/or around the machined portion of the shaped object 15 due to an effect of gravity.

The status analysis unit 104 analyzes in advance, based on the image data and on the molten pool data, whether strain or misshaping will occur in and/or around the machined portion of the shaped object 15 due to failure to produce a desired shape of bead because of the welding status that has fallen outside an appropriate process condition range.

When the status analysis unit 104 of the NC device 1 determines that the balanced welding volume state can be maintained, that is, stable additive manufacturing can be continued (Yes at step S40), the NC device 1 advances the procedure to step S30.

Alternatively, when the status analysis unit 104 determines that the balanced welding volume state cannot be maintained, that is, stable additive manufacturing cannot be continued (No at step S40), the NC device 1 advances the procedure to step S50.

(Step S50)

At step S50, the status analysis unit 104 notifies the production process change unit 105 and the process condition generation unit 106 that stable shaping machining cannot be continued. This causes the production process change unit 105 to interrupt the additive manufacturing process, and to change the production process to a subtractive manufacturing process, that is, to perform a production process switching operation. In this case, the additive manufacturing process is a first production process, and the subtractive manufacturing process is a second production process. In addition, the process condition used in the additive manufacturing process is a first process condition, and the process condition to be used in the subtractive manufacturing process is a second process condition.

The production process switching operation includes an operation in which the production process change unit 105 sends a signal of interruption (switching command) of the additive manufacturing process to the additive manufacturing execution unit 103 to temporarily interrupt the additive manufacturing process. The production process switching operation also includes an operation in which the production process change unit 105 causes the automated transportation unit 101 to perform an operation of transporting the shaped object 15 after completion of interruption of the additive manufacturing process. This operation of transporting the shaped object 15 is performed in such a manner that the production process change unit 105 causes the automated transportation unit 101 to take out the shaped object 15 from the additive manufacturing machine 100 and to place the shaped object 15 on the stage 18 of the subtractive manufacturing machine 102. The production process switching operation further includes an operation in which the production process change unit 105 sends a start signal (switching command) of a subtractive manufacturing process to the subtractive manufacturing execution unit 107 to cause the subtractive manufacturing execution unit 107 to prepare the subtractive manufacturing process. As described above, the production process change unit 105 sends a switching command to provide switching from the additive manufacturing process to the subtractive manufacturing process, to the additive manufacturing execution unit 103 and to the subtractive manufacturing execution unit 107.

Note that when the additive manufacturing machine 100 and the subtractive manufacturing machine 102 are together a composite manufacturing machine having both the additive manufacturing capability and the subtractive manufacturing capability, the operation of switching between the additive manufacturing execution unit 103 and the subtractive manufacturing execution unit 107 in the production process switching operation can be construed as an operation of exchanging the machining heads 8 and 21. That is, when the additive manufacturing machine 100 and the subtractive manufacturing machine 102 are together a composite manufacturing machine, the production process change unit 105 outputs an exchange command (exchange signal) with respect to the machining heads 8 and 21 rather than the switching command. The NC device 1 advances the procedure to step S60 after performing step S50.

(Step S60)

At step S60, the process condition generation unit 106 generates process conditions for use by the subtractive manufacturing execution unit 107 in the subtractive manufacturing process. Specifically, the process condition generation unit 106 determines the moving path of the machining head 21, the scanning speed, and the tool rotation speed of the machining head 21 to be used in the subtractive manufacturing machine 102, and sets these values as the process conditions of the subtractive manufacturing process.

The process condition generation unit 106 sets the head movement path HR21 in the subtractive manufacturing machine 102 based on the machining program 23 input to the additive manufacturing machine 100. Specifically, the process condition generation unit 106 extracts the head movement path HR21 to exclude all the points where strain or misshaping of the shape in and/or around the machined portion may occur, which strain or misshaping is caused by an effect of heat accumulation temperature and an effect of the welding status of the shaped object 15. In this operation, the process condition generation unit 106 extracts the head movement path HR21 for use in the subtractive manufacturing process to cause the head movement path HR21 to trace back from the commanded point of temporary interruption in the additive manufacturing machine 100 with an offset of the machining program 23 in three-dimensional space. That is, the process condition generation unit 106 sets the head movement path HR21 for use in the subtractive manufacturing process to cause the head movement path HR21 to trace, with an offset portion given, the head movement path HR8 that has been set in the machining program 23, in the reverse direction from the position where the additive manufacturing machine 100 has interrupted the additive manufacturing process. This facilitates setting of the start point and the end point of the machining head 21 to be used in the subtractive manufacturing process. This also facilitates setting of the start point of the machining head 8 to be used in the additive process thereafter.

The process condition generation unit 106 also sets the scanning speed of the machining head 21 that has been set in a machining program (which is a machining program 33 described later) used by the subtractive manufacturing machine 102, as a process condition of the subtractive manufacturing process. In addition, the process condition generation unit 106 determines the tool rotation speed of the machining head 21 on the head movement path HR21, based on a maximum value of the amount of removal in the subtractive manufacturing execution unit 107. That is, the process condition generation unit 106 sets a tool rotation speed that enables a desired amount to be removed at a point where the amount of removal is the highest on the head movement path HR21. The process condition generation unit 106 sends the head movement path HR21 and the tool rotation speed on the head movement path HR21 to the subtractive manufacturing execution unit 107. The NC device 1 advances the procedure to step S70 after performing step S60.

(Step S70)

At step S70, the subtractive manufacturing execution unit 107 receives the head movement path HR21, the scanning speed, the tool rotation speed on the head movement path HR21, determined by the process condition generation unit 106. The subtractive manufacturing execution unit 107 thus determines command values of the moving path of the machining head 21, the scanning speed, and the tool rotation speed required for subtractive manufacturing that are to be output to the subtractive manufacturing machine 102. The subtractive manufacturing execution unit 107 causes the subtractive manufacturing machine 102 to start a subtractive manufacturing process using the moving path, the scanning speed, and the tool rotation speed that have been determined. The NC device 1 advances the procedure to step S80 after performing step S70.

(Step S80)

At step S80, after completion of the subtractive manufacturing process performed by the subtractive manufacturing execution unit 107, the production process change unit 105 performs an operation of returning the production process. The operation of returning the production process includes an operation in which the production process change unit 105 receives a notification of completion of subtractive manufacturing from the subtractive manufacturing execution unit 107. The operation of returning the production process also includes an operation in which the production process change unit 105 causes the automated transportation unit 101 to perform an operation of transporting the shaped object 15. This operation of transporting the shaped object 15 is performed in such a manner that the production process change unit 105 causes the automated transportation unit 101 to take out the shaped object 15 from the subtractive manufacturing machine 102 and to place the shaped object 15 on the stage 13 of the additive manufacturing machine 100. The operation of returning the production process further includes an operation in which the production process change unit 105 sends a start signal (switching command) of an additive manufacturing process to the additive manufacturing execution unit 103 to cause the additive manufacturing execution unit 103 to prepare the additive manufacturing process. The NC device 1 advances the procedure to step S90 after performing step S80.

(Step S90)

At step S90, the additive manufacturing execution unit 103 causes the additive manufacturing machine 100 to resume the additive manufacturing process. That is, the additive manufacturing execution unit 103 restarts analysis of the head movement path HR8 for moving the machining head 8 from the end position of subtractive manufacturing in the subtractive manufacturing execution unit 107, based on process details described in the machining program 23. The additive manufacturing execution unit 103 thus determines the head movement path HR8 and the scanning speed. The additive manufacturing execution unit 103 also determines the laser output power value and the amount of metal supply required for the additive manufacturing process based on the machining program 23. Then, the additive manufacturing execution unit 103 causes the additive manufacturing machine 100 to resume the additive manufacturing process using the moving path, the scanning speed, the laser output power value, and the amount of metal supply that have been determined. The NC device 1 advances the procedure to step S100 after performing step S90.

(Step S100)

At step S100, the NC device 1 determines whether all the operations described in the machining program 23 have been completed. When not all the operations described in the machining program 23 have been completed (No at step S100), the NC device 1 repeats the process from step S30 to step S100. The NC device 1 repeats the process from step S30 to step S100 until all the operations described in the machining program 23 are completed. When all the operations described in the machining program 23 have been completed (Yes at step S100), the NC device 1 terminates the process of controlling production of the shaped object 15.

As described above, the NC device 1 is capable of proactively detecting strain or misshaping in the finished product of the shaped object 15 caused by a change in the heat accumulation condition or in the welding status during the additive manufacturing process, and then changing the production process from the additive manufacturing process to the subtractive manufacturing process. This enables the NC device 1 to accurately produce the shaped object 15 having a desired shape efficiently without interruption of the process of production.

An example of the machining program 23 will now be described. FIG. 5 is a diagram illustrating an example of the machining program used by the NC device according to the first embodiment. The machining program 23 provides operations of outputting a command that is an absolute value command, correcting the tool length using an H1-th (where H1 is a natural number) amount of correction, determining the scanning speed, the laser output power value, and the amount of metal supply, and the like. A plurality of amounts of correction are set in the NC device 1 each as the amount of correction for use in tool length correction. The machining program 23 sets in advance what number of amount of correction is to be used among the plurality of amounts of correction.

In addition, a coordinate value group for the first layer, a coordinate value group for each of the second to (N−1)-th layers, a coordinate value group for the N-th layer, and the like of the shaped object 15 are set in the machining program 23. The following description will be provided for a case in which the shaped object 15 has an arc shape as viewed from the Z-axis direction. When the shaped object 15 has an arc shape as viewed from the Z-axis direction, coordinate value groups for the first to N-th layers having the arc shape are set in the machining program 23. The machining program 23 is input to the additive manufacturing execution unit 103 from outside the NC device 1.

Figure 6:
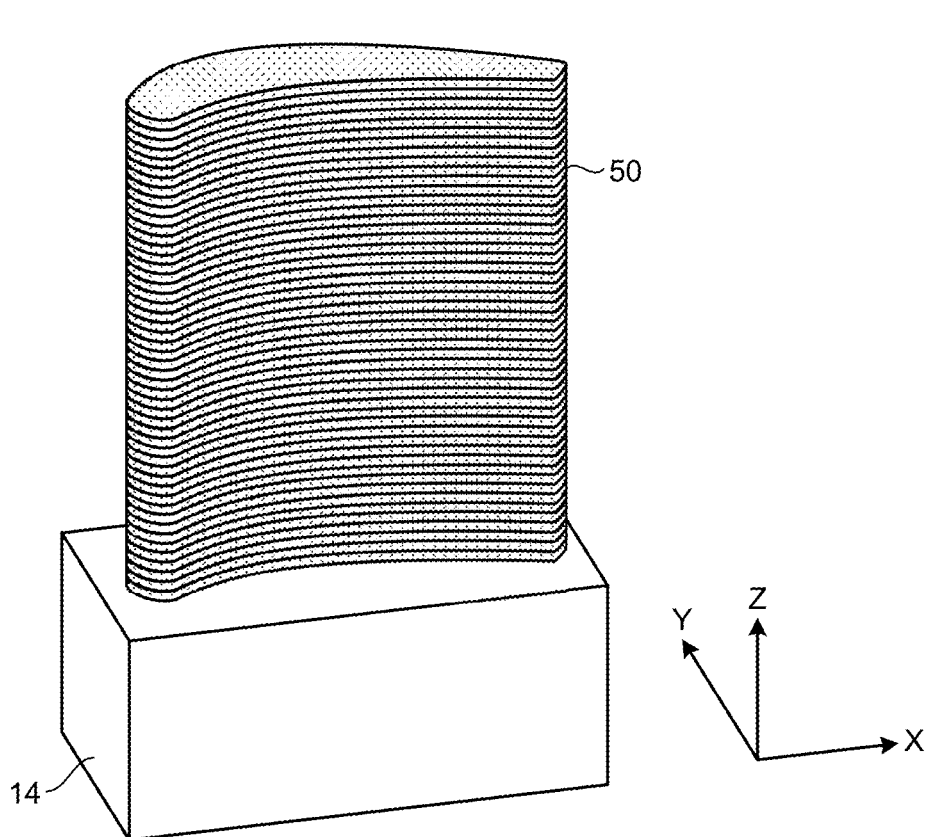
FIG. 6 is a diagram illustrating an example of shaped object produced through additive manufacturing that the NC device according to the first embodiment has caused the additive manufacturing machine to perform using the machining program illustrated in FIG. 5.

FIG. 6 is a diagram illustrating an example of the shaped object produced through additive manufacturing (laminate shaping) that the NC device according to the first embodiment has caused the additive manufacturing machine to perform using the machining program illustrated in FIG. 5. The shaped object 50 illustrated in FIG. 6 is an example of the shaped object 15 produced by the additive manufacturing machine 100.

The additive manufacturing machine 100 heats and melts, by a laser beam, the material 5, which is a metal material such as a metal powder or a metal wire, supplied onto the base substrate 14. The additive manufacturing machine 100 stacks layers of the material 5 with a specified stack height and a specified stack width on the machined portion of the base material surface.

The additive manufacturing machine 100 repeats a process of stacking layers of the material 5 while moving the machining head 8 to cause the area of laser irradiation on the base material to have an arc shape as viewed from the Z-axis direction. A stack of layers of the material 5 in the Z-axis direction having N (where N is a natural number) layers is the shaped object 50 illustrated in FIG. 6.

The first embodiment will be described below with respect to a case in which the shaped object 50 undergoes strain or misshaping of the shape thereof due to an increase in heat accumulation or destabilization of welding status on the surface of the shaped object 50 during execution of a command for an $N_1$-th (where $N_1$ is a natural number from 1 to N) layer in the additive manufacturing process, included in the machining program 23 illustrated in FIG. 5. An operation of each component of the NC device 1 will next be described in detail.

(Additive Manufacturing Execution Unit 103)

The additive manufacturing execution unit 103 of the NC device 1 analyzes the machining program 23, and performs additive manufacturing using the additive manufacturing machine 100. The additive manufacturing execution unit 103 analyzes operations to be performed after the operation currently being performed, of the machining program 23 illustrated in FIG. 5.

The additive manufacturing execution unit 103 analyzes the moving path and a scanning speed Fc(t) of the machining head 8 described in the machining program 23, and determines the position of the machining head 8 at every unit time. Specifically, the additive manufacturing execution unit 103 performs an acceleration-deceleration process to generate a speed waveform for accelerating or decelerating at a preset acceleration, and a smoothing process to smooth the speed waveform generated in the acceleration-deceleration process, thereby determines the position of the machining head 8. Note that the smoothing process is also referred to as moving average filtering.

In addition, the additive manufacturing execution unit 103 performs an interpolation process to compute an interpolated point, which is the machining head position at each unit time when the machining head 8 is moved at a scanning speed after the smoothing process is performed. The additive manufacturing execution unit 103 thus determines the commanded position for the machining head 8. The additive manufacturing execution unit 103 outputs this commanded position to the head drive unit 12 every unit time. This causes the machining head 8 to be controlled to move to a desired position that has been set in the machining program 23.

The additive manufacturing execution unit 103 also analyzes the speed of supply of the material 5 and the intensity of the laser beam described in the machining program 23, and determines the speed of supply of the material 5 per unit time and the intensity of the laser beam.

The additive manufacturing execution unit 103 adjusts a laser output power value Pc(t) at the laser irradiation position and an amount of metal supply Wc(t) according to the scanning speed Fc(t) at the laser irradiation position using Equation (1) and Equation (2) below.

Formula 1

$$Pc(t) = \frac{Fc(t)}{F}P \qquad (1)$$

Formula 2

$$Wc(t) = \frac{Fc(t)}{F}V \qquad (2)$$

In this respect, P, V, and F respectively represent the laser output power, the amount of metal supply, and the scanning speed described in the machining program 23. The additive manufacturing execution unit 103 outputs the laser output power value Pc(t) according to the scanning speed at the laser irradiation position to the laser oscillator 2. The additive manufacturing execution unit 103 also outputs the amount of metal supply Wc(t) of the metal powder or the metal wire to the material supply unit 4. Accordingly, the additive manufacturing execution unit 103 controls the laser output power and the amount of metal supply to each have a user desired value specified in the machining program 23. Note that the program analysis process for layers from the first layer to the N-th layer performed by the additive manufacturing execution unit 103 and the analysis process performed by the status analysis unit 104 are performed concurrently.

Upon resuming the additive manufacturing process, the additive manufacturing execution unit 103 analyzes the moving path and the scanning speed Fc(t) of the machining head 8 described in the machining program 23 from the end position of the subtractive manufacturing process, and determines the machining head position at each unit time.

(Status Analysis Unit 104)

The status analysis unit 104 of the NC device 1 collects the sensor data 24 from a sensor provided in the additive manufacturing machine 100, and estimates a state during additive manufacturing based on the sensor data 24. Specifically, the status analysis unit 104 obtains, from the sensor data 24, image data obtained by observation of the product shape formed by the additive manufacturing machine 100. Then, the status analysis unit 104 extracts a feature quantity of the product shape, from the image data obtained by observation of the product shape formed by the additive manufacturing machine 100. The feature quantity of the product shape extracted in this operation includes at least one of the stack height and the stack width. The status analysis unit 104 calculates the feature quantity including at least one of the stack height and the stack width using an image analysis technique such as edge detection or binarization.

The status analysis unit 104 obtains temperature data obtained by observation of the surface temperature of the machined portion during the additive manufacturing process. The temperature data may be a heat map that represents the machined portion using different colors according to the surface temperature, obtained from one infrared thermography unit, or may be data that provides the surface temperature at each coordinate position of the shaped object 15 using numerical values. Alternatively, the status analysis unit 104 may obtain a heat map generated by detection from a plurality of directions using a plurality of sensors.

The status analysis unit 104 also obtains molten pool data obtained by observation of the molten pool formed by the additive manufacturing machine 100. The status analysis unit 104 obtains the molten pool data by extracting a feature quantity of the shape from the image data obtained by measurement of the molten pool. The feature quantity of the shape extracted in this operation includes at least one of the molten pool size and the distance from the molten pool center to the material 5. The status analysis unit 104 calculates the feature quantity including at least one of the molten pool size and the distance from the molten pool center to the material 5 using an image analysis technique such as edge detection or binarization.

In addition, the status analysis unit 104 may estimate the melt state by using data of load (load torque) exerted on the material supply unit 4 or the like instead of by direct observation of the molten pool from the image data. The status analysis unit 104 makes an analysis in advance of possible occurrence of strain or misshaping in and/or around the machined portion of the shaped object 15 due to a change in the heat accumulation condition and in the welding status, based on the image data, the temperature data, and the molten pool data.

A relationship between the temperature data and a change in the bead width will now be described. A relationship between the molten pool data and a change in the bead height will also be described. The bead width and the bead height are examples of shape condition representing the shape of the shaped object 15.

Figure 7:
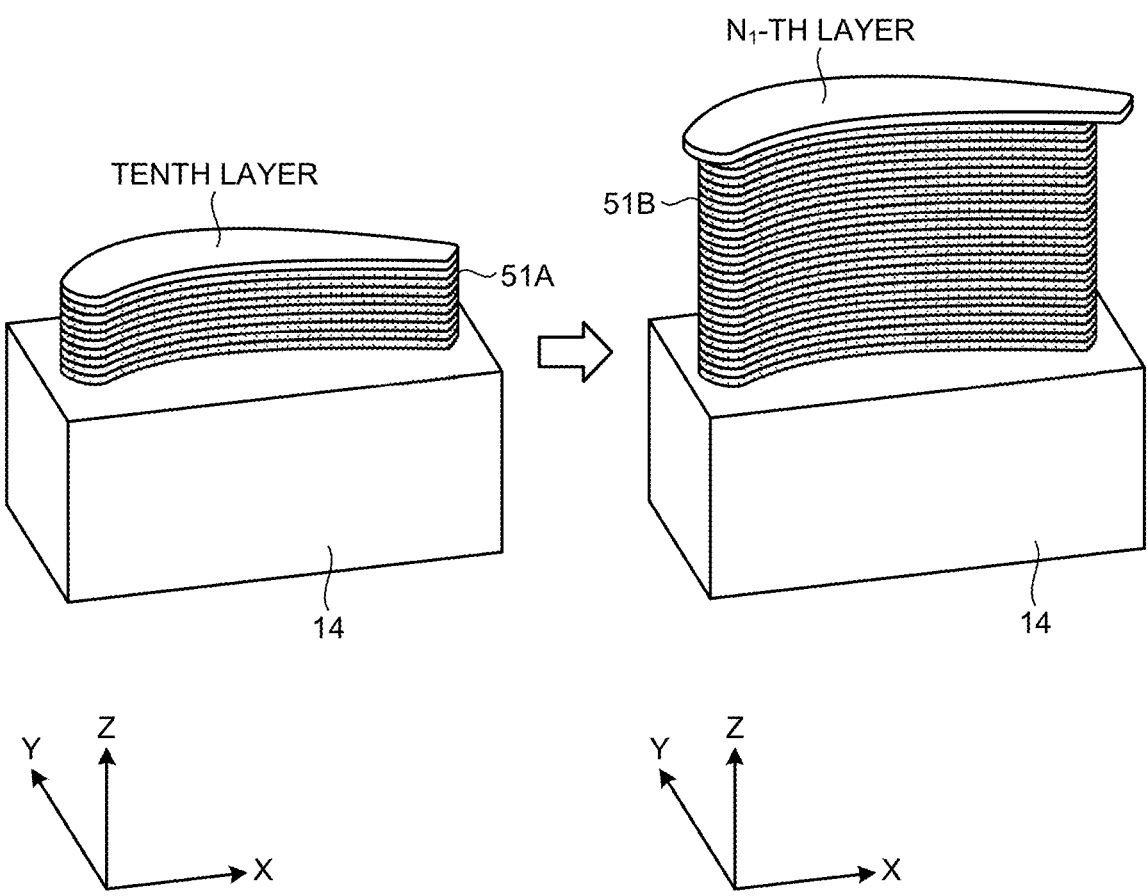
FIG. 7 is a diagram for describing a relationship between temperature data in a machined portion and a change in the bead width, where the temperature data has been extracted by the NC device according to the first embodiment as a feature quantity during an additive manufacturing process.

FIG. 7 is a diagram for describing a relationship between the temperature data in the machined portion and a change in the bead width, where the temperature data has been extracted by the NC device according to the first embodiment as a feature quantity during an additive manufacturing process.

FIG. 7 illustrates a shaped object 51A, which is a stack of up to the tenth layer, and a shaped object 51B, which is a stack of up to an $N_1$-th layer, in the case of production of the shaped object 50, where $N_1$ is a natural number greater than 10. As illustrated in FIG. 7, the shaped object 51A, which is a stack of up to the tenth layer, is a product of desired stacking, and the shaped object 51B, which is a stack of up to the $N_1$-th layer, is not a product of desired stacking.

As the additive manufacturing time elapses, continued irradiation of the base material with a laser beam causes an increase in the amount of heat accumulation in the shaped object 51B. This results in a change in the time required for the melted material to solidify. Then, due to gravity acting on the melted material, the stack width is increased to be larger than a desired value, and the stack height is decreased to be lower than a desired value, thereby causing misshaping to be more easily to occur. That is, with an increase in the heat accumulation in the shaped object 51B, the time required for the melted material to solidify is increased, thereby making the melted material excessively broad. Thus, the status analysis unit 104 proactively detects occurrence of strain or misshaping in and/or around the machined portion of the shaped object 51B due to gravity when the time required for the melted material to solidify is increased due to heat accumulation. The status analysis unit 104 generates a shaping error signal when the amount of heat accumulation in the temperature data in the machined portion is greater than a threshold of the heat accumulation, and the stack width is thus greater than a threshold of the stack width.

Figure 8:
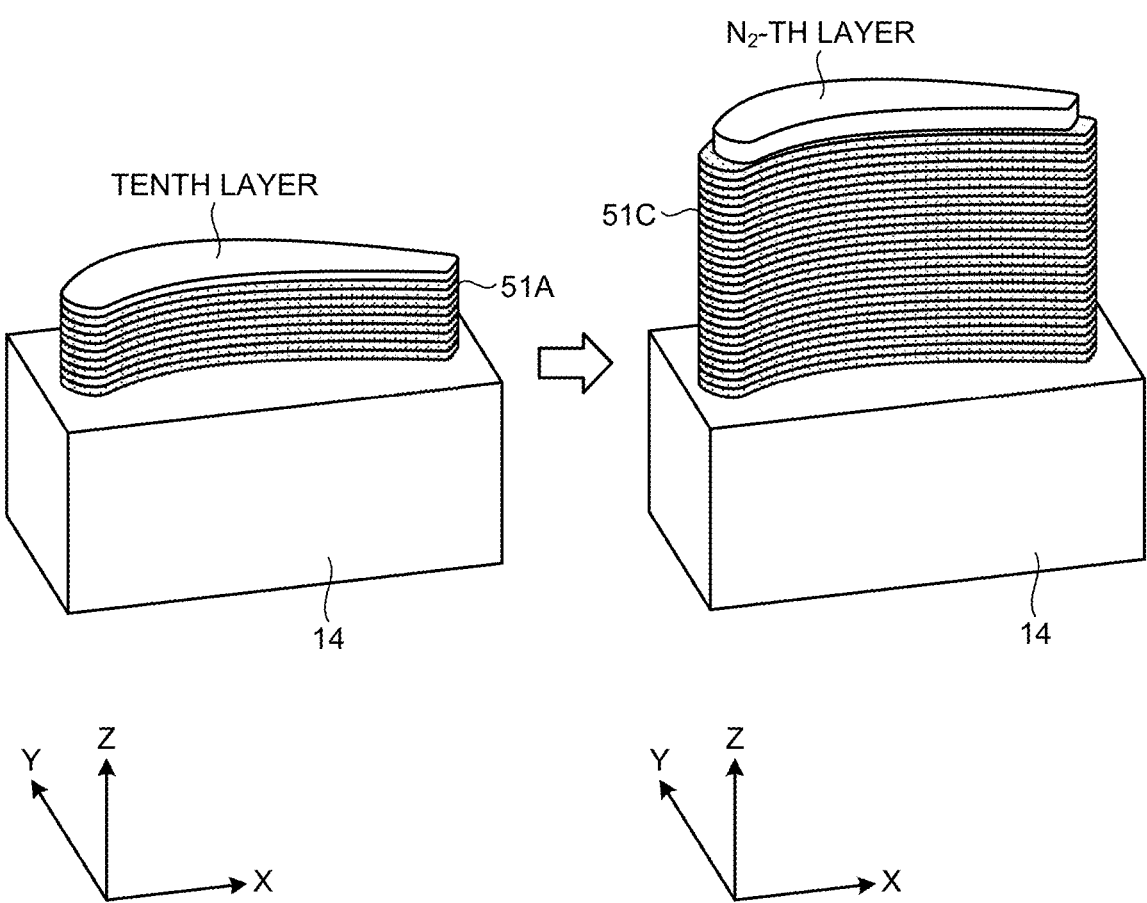
FIG. 8 is a diagram for describing a relationship between molten pool data in the machined portion and a change in the bead height, where the molten pool data has been extracted by the NC device according to the first embodiment as a feature quantity during the additive manufacturing process.

FIG. 8 is a diagram for describing a relationship between the molten pool data in the machined portion and a change in the bead height, where the molten pool data has been extracted by the NC device according to the first embodiment as a feature quantity during an additive manufacturing process.

FIG. 8 illustrates the shaped object 51A, which is a stack of up to the tenth layer, and a shaped object 51C, which is a stack of up to an $N_2$-th layer, in the case of production of the shaped object 50, where $N_2$ is a natural number greater than 10. As illustrated in FIG. 8, the shaped object 51A, which is a stack of up to the tenth layer, is a product of desired stacking, and the shaped object 51C, which is a stack of up to the $N_2$-th layer, is not a product of desired stacking.

Even when an optimum amount of melt of the material 5 was commanded with respect to the laser beam at the start of production, the heat source of the laser beam makes the material 5 more readily melt as the additive manufacturing (laminate shaping) time elapses, thereby increasing the distance between the material 5 being supplied and the molten pool formed of the material 5 melted. This causes a reduction in the molten pool size, thereby resulting in the insufficient welding volume state. Thus, the stack width is decreased to be smaller than a desired value, and the stack height is increased to be higher than a desired value. In addition, variations in the stack width and in the stack height increase. This causes misshaping to be more easily to occur. Accordingly, an increase in the additive manufacturing (laminate shaping) time will cause the welding status to fall outside the optimum condition range, and will thus prevent a desired shape of bead from being produced, thereby causing strain or misshaping to occur in and/or around the machined portion of the shaped object 51C. The status analysis unit 104 proactively detects such strain or misshaping in and/or around the machined portion. The status analysis unit 104 generates a shaping error signal when the molten pool size in the molten pool data in the machined portion is less than a threshold of the molten pool size, and the stack height is thus greater than a threshold of the stack height.

The first embodiment assumes that strain or misshaping of the shape occurs in the $N_1$-th layer due to an effect of the heat accumulation condition, and strain or misshaping of the shape occurs in the $N_2$-th layer due to an effect of the welding status, during execution of the machining program 23. Thus, the analysis unit 104 analyzes the sensor data 24, and then generates a shaping error signal merely once at either the $N_1$-th layer or the $N_2$-th layer before strain or misshaping will occur. The analysis unit 104 may, however, generate a shaping error signal multiple times, i.e., each time occurrence of strain or misshaping is detected.

(Production Process Change Unit 105)

The production process change unit 105 of the NC device 1 automatically changes the production process between the additive manufacturing process and the subtractive manufacturing process based on the result of analysis of the machining status from the status analysis unit 104. In the first embodiment, no shaping error signal is generated in the status analysis unit 104 during formation of layers from the first layer to the $(N_1-1)$-th layer in the machining program 23, in which case the production process change unit 105 continues the additive manufacturing process in the additive manufacturing machine 100. Meanwhile, at the $N_1$-th layer in the machining program 23, a shaping error signal is input from the status analysis unit 104, and the production process change unit 105 accordingly performs operation to change the production process.

As part of the operation to change the production process, the production process change unit 105 sends a signal of interruption of the additive manufacturing process to the additive manufacturing execution unit 103 to temporarily interrupt the additive manufacturing process. When the additive manufacturing process performed by the additive manufacturing machine 100 is stopped, the production process change unit 105 sends a signal for starting transportation of the shaped object 15 to the automated transportation unit 101 also as part of the operation to change the production process. This causes the automated transportation unit 101 to take out the shaped object 15 from the additive manufacturing machine 100, and to place the shaped object 15 on the stage 18 of the subtractive manufacturing machine 102. When the automated transportation unit 101 has completed the operation of placing the shaped object 15 on the stage 18 of the subtractive manufacturing machine 102, the production process change unit 105 sends a signal for starting a subtractive manufacturing process to the subtractive manufacturing machine 102. This causes the subtractive manufacturing process to be temporarily started.

When the subtractive manufacturing process is completed, the production process change unit 105 performs an operation of returning the production process. The production process change unit 105 sends a signal for stopping the subtractive manufacturing process to the subtractive manufacturing execution unit 107 to interrupt the subtractive manufacturing process. In addition, when the subtractive manufacturing process performed by the subtractive manufacturing machine 102 is stopped, the production process change unit 105 sends a signal for starting transportation of the shaped object 15 to the automated transportation unit 101 as part of the operation of returning the production process. This causes the automated transportation unit 101 to take out the shaped object 15 from the subtractive manufacturing machine 102, and to place the shaped object 15 on the stage 13 of the additive manufacturing machine 100. When the automated transportation unit 101 has completed the operation of placing the shaped object 15 on the stage 13 of the additive manufacturing machine 100, the production process change unit 105 sends a signal for resuming the additive manufacturing process to the additive manufacturing machine 100. This causes the additive manufacturing process to be resumed.

The foregoing description has been given with respect to a case in which the production process change unit 105 performs the production process change operation and the production process return operation merely once during machining of the $N_1$-th layer of the machining program 23. However, as described with reference to FIG. 3, the production process change unit 105 performs the production process change operation and the production process returning operation each time a shaping error signal is input from the status analysis unit 104.

(Process Condition Generation Unit 106)

The process condition generation unit 106 of the NC device 1 determines the process conditions to be used by the subtractive manufacturing machine 102 based on the machining program 23 that has been used by the additive manufacturing machine 100 and on the machining status estimated by the status analysis unit 104.

The process condition generation unit 106 generates a machining path for cutting the $N_1$-th layer by the subtractive manufacturing execution unit 107, i.e., the head movement path HR21, based on the machining program 23 and on the machining status. Description will be first provided in the context of the head movement path HR21 for cutting the $N_1$-th layer, extracted when heat accumulation has affected the process.

Figure 9:
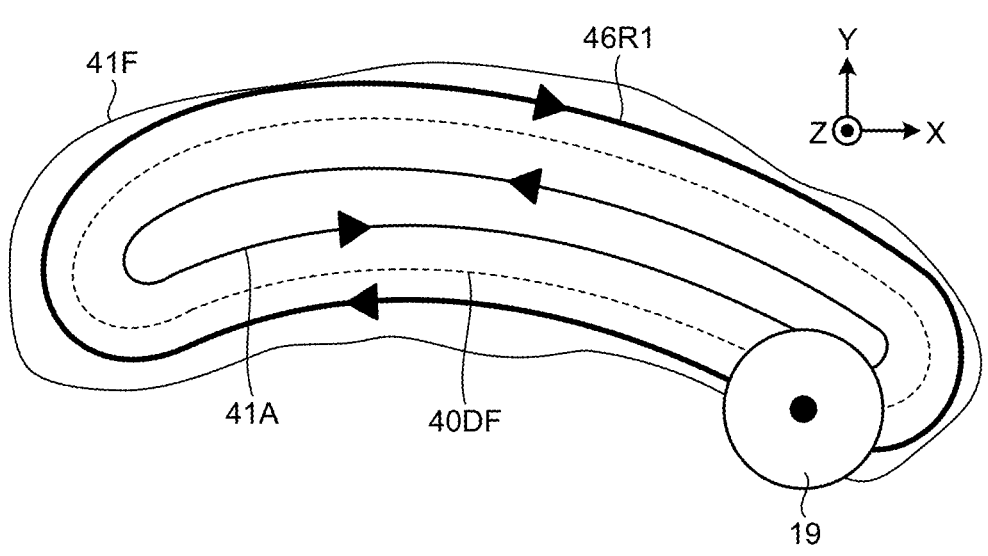
FIG. 9 is a diagram illustrating a first example of a head movement path in the subtractive manufacturing process, generated by the NC device according to the first embodiment when heat accumulation has affected the process.

FIG. 9 is a diagram illustrating a first example of the head movement path in the subtractive manufacturing process, generated by the NC device according to the first embodiment when heat accumulation has affected the process. FIG. 9 indicates the desired shape by a shape 40DF, and the head movement path HR8, which is the machining path in additive manufacturing of the $N_1$-th layer, by an additive manufacturing path 41A. In addition, FIG. 9 indicates the actual stack shape of the $N_1$-th layer by a stack shape 41F. FIG. 9 further indicates, by a subtractive manufacturing path 46R1, a head movement path HR21 that is the machining path to be used when cutting is performed on the $N_1$-th layer, extracted when heat accumulation has affected the process.

Due to occurrence of strain or misshaping in the $N_1$-th layer, the process condition generation unit 106 extracts a head movement path HR21 obtained by reverse reproduction in a direction opposite the advancing direction to temporally trace back from the $N_1$-th layer to the $(N_1-1)$-th layer in the machining program 23. In other words, the process condition generation unit 106 extracts a head movement path HR21 that proceeds along the additive manufacturing path 41A of the $N_1$-th layer in the reverse direction.

In addition, the stack width of the bead of the $N_1$-th layer formed in the additive manufacturing process is greater than the stack width of the beads formed before the $N_1$-th layer due to an effect of heat accumulation. The process condition generation unit 106 accordingly generates the subtractive manufacturing path 46R1 by offsetting the head movement path HR8 with respect to the desired shape 40DF in the normal direction, which is perpendicular to the machining direction, in the plane parallel to the XY-plane. The offset amount in this case is set to a value exceeding the shape variation (i.e., an amount of deviation in the height or width of the shaped object 15 relative to a desired value) of the $N_1$-th layer to allow the tool 19 to pass outside the stack shape 41F at a position corresponding to the maximum value of the shape variation. Accordingly, the process condition generation unit 106 may cause the subtractive manufacturing machine 102 to remove the entire $N_1$-th layer or remove only a portion relating to the strain or misshaping of the shape.

Note that when the subtractive manufacturing machine 102 fails to cut the bead of the $N_1$-th layer in a single subtractive manufacturing path, the process condition generation unit 106 may generate a plurality of subtractive manufacturing paths by offsetting a plurality of times the additive manufacturing path 41A extracted.

Figure 10:
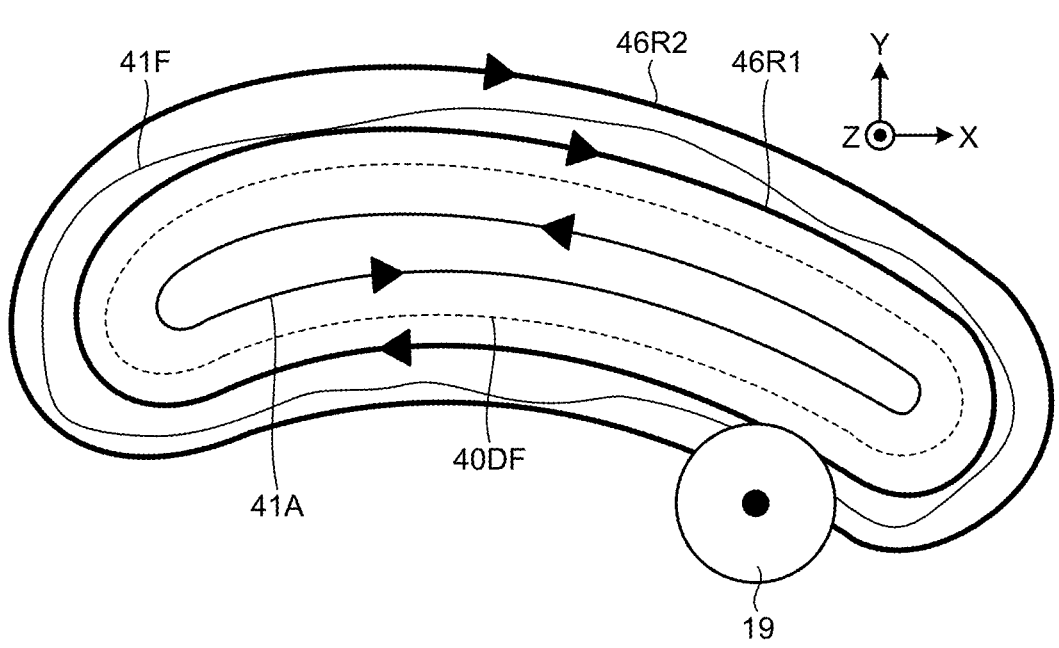
FIG. 10 is a diagram illustrating a second example of the head movement path in the subtractive manufacturing process, generated by the NC device according to the first embodiment when heat accumulation has affected the process.

FIG. 10 is a diagram illustrating a second example of the head movement path in the subtractive manufacturing process, generated by the NC device according to the first embodiment when heat accumulation has affected the process. FIG. 10 indicates, similarly to FIG. 9, the desired shape by the shape 40DF, and the head movement path HR8 in additive manufacturing of the $N_1$-th layer, by the additive manufacturing path 41A. In addition, FIG. 10 indicates the actual stack shape of the $N_1$-th layer by the stack shape 41F.

FIG. 10 further indicates the first-time head movement path HR21 by the subtractive manufacturing path 46R1 and a second-time head movement path HR21 by a subtractive manufacturing path 46R2 when cutting is performed on the $N_1$-th layer, extracted when heat accumulation has affected the process. Note that the subtractive manufacturing machine 102 may first perform the subtractive manufacturing process along the subtractive manufacturing path 46R2, and then perform the subtractive manufacturing process along the subtractive manufacturing path 46R1.

Next, description will be provided in the context of the head movement path HR21 for cutting the $N_1$-th layer or the $N_2$-th layer, extracted when the insufficient welding volume state has occurred. The removal process for the $N_1$-th layer and the removal process for the $N_2$-th layer are similar to each other, and the following description therefore describes the removal process for the $N_1$-th layer.

Figure 11:
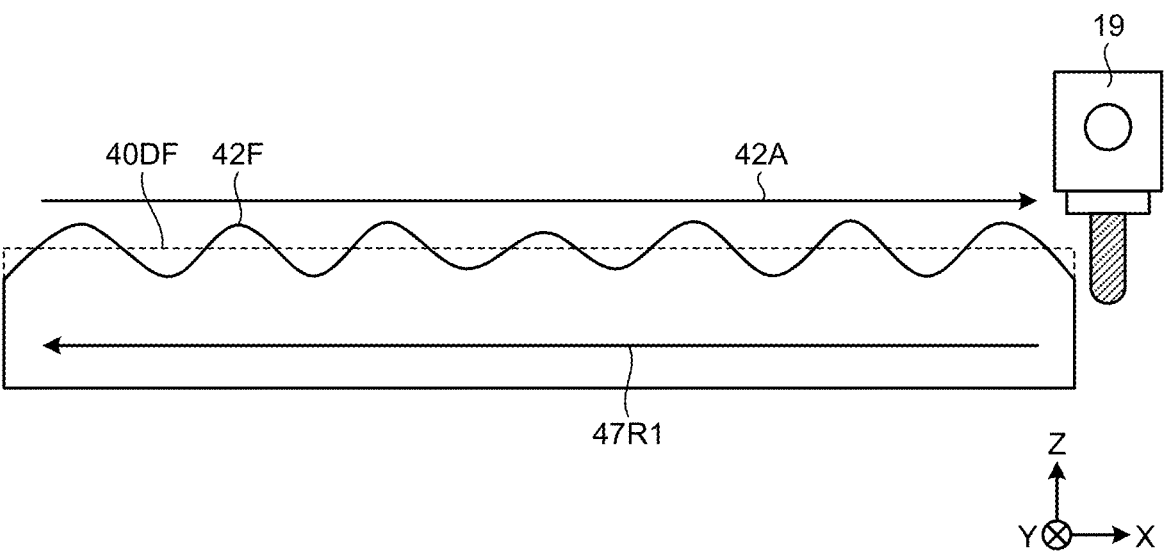
FIG. 11 is a diagram illustrating a first example of the head movement path in the subtractive manufacturing process, generated by the NC device according to the first embodiment when an insufficient welding volume state has occurred.

FIG. 11 is a diagram illustrating a first example of the head movement path in the subtractive manufacturing process, generated by the NC device according to the first embodiment when the insufficient welding volume state has occurred. FIG. 11 indicates the desired shape by the shape 40DF, and the head movement path HR8 in additive manufacturing of the $N_1$-th layer by an additive manufacturing path 42A. In addition, FIG. 11 indicates the actual stack shape of the $N_1$-th layer by a stack shape 42F. FIG. 11 further indicates, by a subtractive manufacturing path 47R1, a head movement path HR21 to be used when cutting is performed on the $N_1$-th layer, extracted when the insufficient welding volume state has affected the process.

Due to occurrence of strain or misshaping in the $N_1$-th layer, the process condition generation unit 106 extracts a head movement path HR21 obtained by reverse reproduction in a direction opposite the advancing direction from the $N_1$-th layer to the $(N_1-1)$-th layer in the machining program 23. In other words, the process condition generation unit 106 extracts a head movement path HR21 that proceeds along the additive manufacturing path 42A of the $N_1$-th layer in the reverse direction.

In addition, the stack height of the bead of the $N_1$-th layer formed in the additive manufacturing process is greater than the stack height of the beads formed before the $N_1$-th layer due to an insufficient state of the welding status. The process condition generation unit 106 accordingly generates the subtractive manufacturing path 47R1 by offsetting the head movement path HR8 with respect to the desired shape 40DF in the Z-axis direction (depth direction). The offset amount in this case is set to a value exceeding the shape variation calculated based on the maximum value and the minimum value of the stack height of the $N_1$-th layer. Accordingly, the process condition generation unit 106 may cause the subtractive manufacturing machine 102 to remove the entire $N_1$-th layer or remove only a portion relating to the strain or misshaping of the shape.

Note that when the subtractive manufacturing machine 102 fails to cut the bead of the $N_1$-th layer in a single subtractive manufacturing path, the process condition generation unit 106 may generate a plurality of subtractive manufacturing paths by offsetting a plurality of times the additive manufacturing path 42A extracted.

Figure 12:
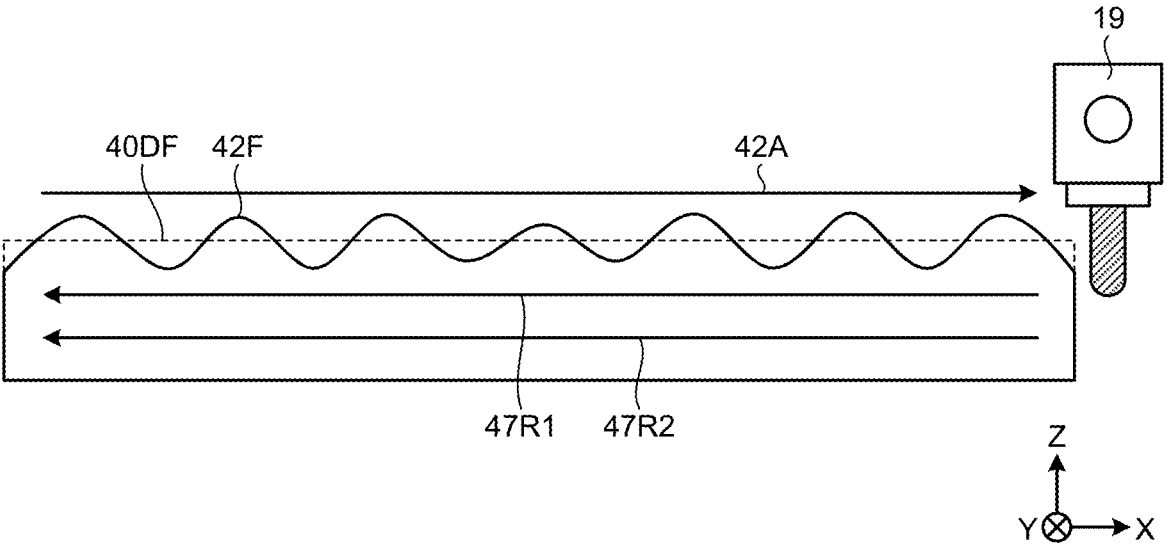
FIG. 12 is a diagram illustrating a second example of the head movement path in the subtractive manufacturing process, generated by the NC device according to the first embodiment when the insufficient welding volume state has occurred.

FIG. 12 is a diagram illustrating a second example of the head movement path in the subtractive manufacturing process, generated by the NC device according to the first embodiment when the insufficient welding volume state has occurred. FIG. 12 indicates, similarly to FIG. 11, the desired shape by the shape 40DF, and the head movement path HR8 in additive manufacturing of the $N_1$-th layer, by the additive manufacturing path 42A. In addition, FIG. 12 indicates the actual stack shape of the $N_1$-th layer by the stack shape 42F.

FIG. 12 further indicates the first-time head movement path HR21 by the subtractive manufacturing path 47R1 and a second-time head movement path HR21 by a subtractive manufacturing path 47R2 when cutting is performed on the $N_1$-th layer, extracted when the insufficient welding volume state has occurred.

In addition, the process condition generation unit 106 determines the tool rotation speed to be used in the subtractive manufacturing machine 102 according to the amount of removal of the shaped object 15. The shape of bead of the shaped object 15 has non-uniform and varied stack width and varied stack height due to the effect of the heat accumulation condition and of the welding status. Accordingly, the process condition generation unit 106 derives, based on the offset amount, a maximum removal volume on the head movement path HR21 (subtractive manufacturing paths 47R1 and 47R2) used in the subtractive manufacturing machine 102. The process condition generation unit 106 then determines a tool rotation speed optimum for the maximum removal volume, and a scanning speed at this tool rotation speed, based on the stacking condition data stored in the NC device 1. That is, the process condition generation unit 106 determines the tool rotation speed and the scanning speed based on the volume at the position where the maximum value is reached on the subtractive manufacturing paths 47R1 and 47R2, of the volume of the shaped object 15 removed in the subtractive manufacturing process, and based on stacking conditions.

Note that the process condition generation unit 106 may include a state quantity acquisition unit that obtains state quantities including a variation in the shape height or the shape width of the shaped object 15 after completion of a first process, a variation in the shape height or the shape width of the shaped object 15 after completion of a second process, and the offset amount of the tool path in the second process. The process condition generation unit 106 may also include a learning unit that learns, based on these state quantities, an offset amount of the tool path in the second process that reduces the variation in the shape height or the shape width of the shaped object 15 after completion of the second process.

(Subtractive Manufacturing Execution Unit 107)

The subtractive manufacturing execution unit 107 of the NC device 1 analyzes the process conditions including the head movement path HR21 generated by the process condition generation unit 106, and causes the subtractive manufacturing machine 102 to perform subtractive manufacturing. The subtractive manufacturing execution unit 107 analyzes operations to be performed after the operation currently being performed, of the head movement path HR21 generated by the process condition generation unit 106.

The subtractive manufacturing execution unit 107 analyzes the head movement path HR21 and the scanning speed in the subtractive manufacturing machine 102 determined by the process condition generation unit 106, and determines the machining head position of the machining head 21 at every unit time. Specifically, the subtractive manufacturing execution unit 107 performs an acceleration-deceleration process to generate a speed waveform for accelerating or decelerating at a preset acceleration, and a smoothing process to smooth the speed waveform generated in the acceleration-deceleration process, thereby determines the machining head position of the machining head 21.

In addition, the subtractive manufacturing execution unit 107 performs an interpolation process to compute an interpolated point, which is the machining head position at each unit time when the machining head is moved at a scanning speed after the smoothing process is performed. The subtractive manufacturing execution unit 107 thus determines the commanded position of the machining head 21. The subtractive manufacturing execution unit 107 outputs this commanded position to the head drive unit 20 every unit time. This causes the machining head 21 to be controlled to move to a desired position.

The subtractive manufacturing execution unit 107 analyzes the tool rotation speed determined by the process condition generation unit 106, and determines a tool rotational position at every unit time. The head drive unit 20 outputs the tool rotational position at every unit time determined, to a spindle control device (not illustrated). This causes the tool rotation speed to be controlled to a desired value.

As described above, according to the first embodiment, the NC device 1 proactively detects strain or misshaping of the shaped object 15 caused by a change in the heat accumulation condition or in the welding status during additive manufacturing (laminate shaping), and then changes the production process from the additive manufacturing process to the subtractive manufacturing process. In this operation, the NC device 1 determines process conditions including the head movement path HR21 to be used in the subtractive manufacturing process, based on the process conditions used in the additive manufacturing machine 100. This enables the NC device 1 to accurately produce the shaped object 15 having a desired shape efficiently without interruption of the process of production.

In addition, the NC device 1 is also capable of switching online between the additive manufacturing machine 100 and the subtractive manufacturing machine 102. The NC device 1 can thus continue the process of production before and after switching between the additive manufacturing process and the subtractive manufacturing process, thereby enabling coordination between processes, and improvement in the production efficiency, to be provided.

Second Embodiment

Figure 15:
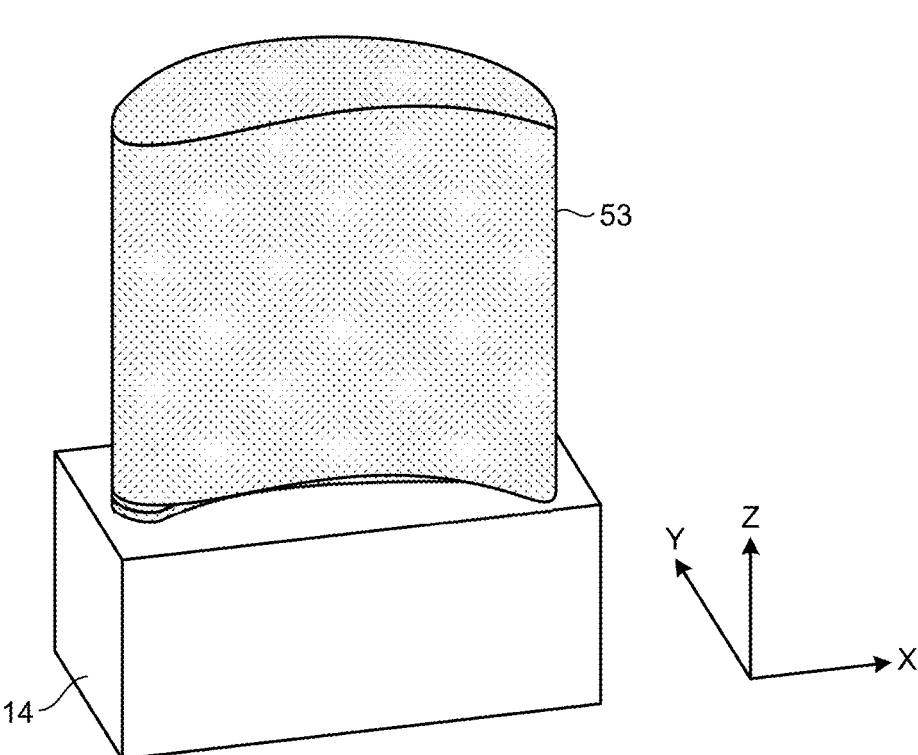
FIG. 15 is a diagram illustrating an example of shaped object produced through subtractive manufacturing that the NC device according to the second embodiment has caused the subtractive manufacturing machine to perform.

A second embodiment will next be described with reference to FIGS. 13 to 15. The second embodiment will be described with respect to a case in which the subtractive manufacturing machine removes a part of the shaped object 15, and when the finished surface has a flaw or the like, the additive manufacturing machine performs an additive manufacturing process.

The machining system 60 of the second embodiment includes an additive manufacturing machine 200 in place of the additive manufacturing machine 100, and a subtractive manufacturing machine 202 in place of the subtractive manufacturing machine 102. The machining system 60 of
the second embodiment also includes an NC device 1A in
place of the NC device 1. The machining system 60 of the
second embodiment further includes the automated trans-
portation unit 101 similarly to the machining system 60 of
the first embodiment. The additive manufacturing machine
200 is a machine similar to the additive manufacturing
machine 100. The subtractive manufacturing machine 202 is
a machine similar to the subtractive manufacturing machine
102.

Figure 13:
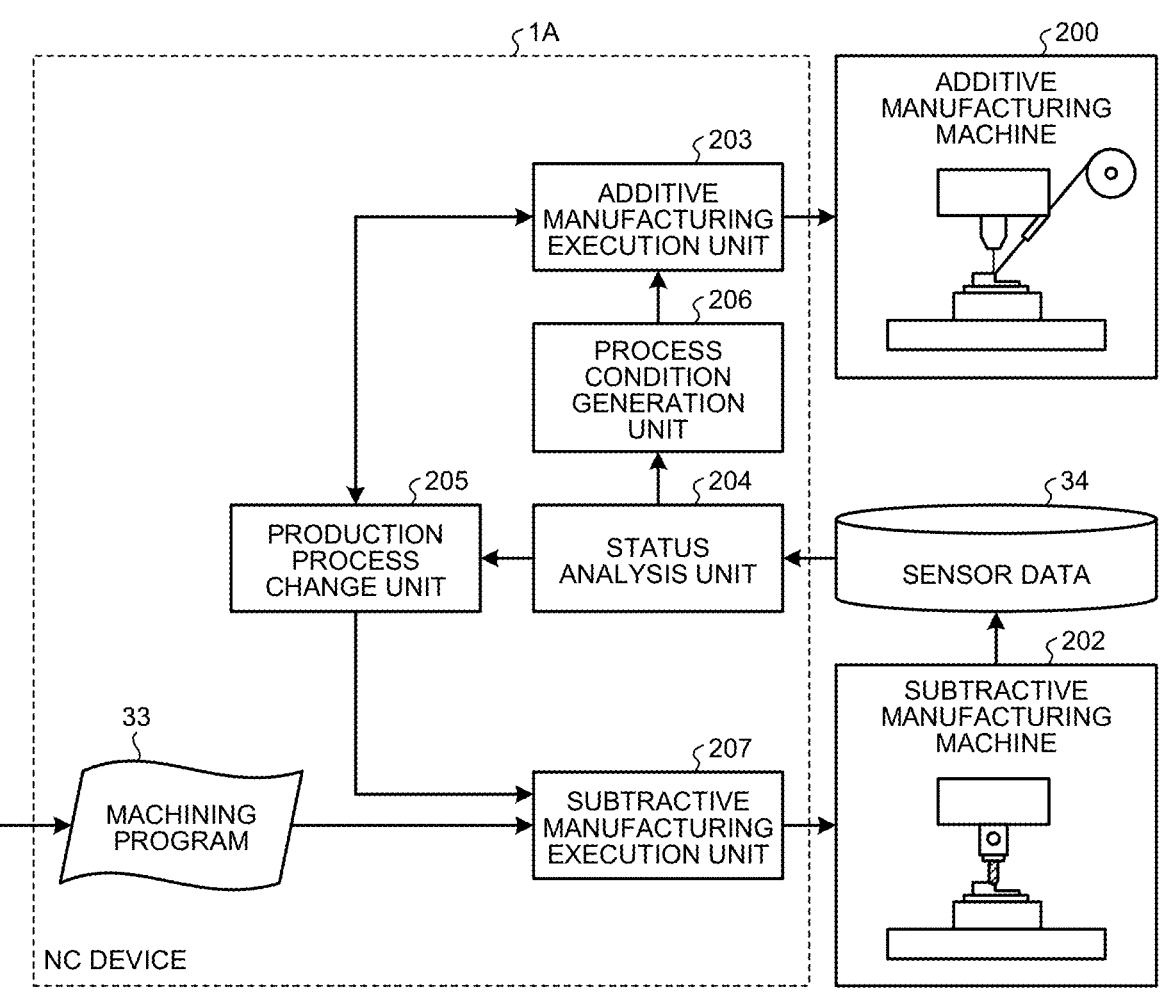
FIG. 13 is a diagram illustrating a functional configuration of an NC device according to a second embodiment.

FIG. 13 is a diagram illustrating a functional configura-
tion of the NC device according to the second embodiment.
Components providing the same functionality as the com-
ponents illustrated in FIG. 2 among the components illus-
trated in FIG. 13 are designated by like reference characters,
and duplicate description will be omitted.

The NC device 1A of the second embodiment includes an
additive manufacturing execution unit 203, a status analysis
unit 204, a production process change unit 205, a process
condition generation unit 206, and a subtractive manufac-
turing execution unit 207. The additive manufacturing
execution unit 203 performs a process corresponding to the
process performed by the additive manufacturing execution
unit 103. The status analysis unit 204 performs a process
corresponding to the process performed by the status analy-
sis unit 104. The production process change unit 205 per-
forms a process corresponding to the process performed by
the production process change unit 105. The process con-
dition generation unit 206 performs a process corresponding
to the process performed by the process condition generation
unit 106. The subtractive manufacturing execution unit 207
performs a process corresponding to the process performed
by the subtractive manufacturing execution unit 107.

The subtractive manufacturing execution unit 207
receives a machining program 33 which is input from
outside. The machining program 33 is a program for use in
shaping the shaped object 15 into a desired shape by
removing a part of the shaped object 15.

The machining program 33 includes a description of a
move command and a speed command needed for moving
the workpiece 16 or the machining head 21 along a preset
path, and a rotate command that specifies a tool rotation
speed needed for providing desired removal of surface
roughness. The move command is represented by a move
command value. The speed command is represented by a
speed command value. The rotate command is represented
by a rotate command value.

The subtractive manufacturing execution unit 207 also
receives a switching command with respect to the produc-
tion process, from the production process change unit 205.
The switching command with respect to the production
process is a switching command to provide switching from
the subtractive manufacturing process to the additive manu-
facturing process, or a switching command to provide
switching from the additive manufacturing process to the
subtractive manufacturing process.

The subtractive manufacturing execution unit 207 con-
trols, based on the machining program 33, the head move-
ment path HR21 and the tool rotation speed on the head
movement path HR21. Thus, the subtractive manufacturing
execution unit 207 causes the subtractive manufacturing
machine 202 to remove a part of the shaped object 15 by
subtractive manufacturing.

The subtractive manufacturing execution unit 207 stops
the subtractive manufacturing process when a switching
command is received for switching the production process
from the subtractive manufacturing process to the additive manufacturing process. The additive manufacturing execu-
tion unit 203 resumes the additive manufacturing process
when a switching command is received for switching the
production process from the subtractive manufacturing pro-
cess to the additive manufacturing process.

The status analysis unit 204 receives sensor data 34
obtained from the subtractive manufacturing machine 202.
The status analysis unit 204 analyzes the machining status of
the shaped object 15 based on the sensor data 34. The sensor
data 34 includes image data; a load torque exerted on a
scanning shaft of the machining head 21, detected by a
motor detector included in the head drive unit 20; and the
like.

The status analysis unit 204 sends a machining status,
which is an analysis result, to the production process change
unit 205 and to the process condition generation unit 206.
The machining status sent by the status analysis unit 204 to
the process condition generation unit 206 includes a result of
determination of whether the finished surface in the sub-
tractive manufacturing process is free of flaws.

The sensor data 34 obtained from the subtractive manu-
facturing machine 202 may be stored in a storage device or
the like. In this case, the storage device may be disposed
inside the NC device 1A or outside the NC device 1A. In
addition, the storage device may be disposed inside the
additive manufacturing machine 200 or outside the additive
manufacturing machine 200.

The production process change unit 205 automatically
changes, similarly to the production process change unit
105, the production process between the subtractive manu-
facturing process and the additive manufacturing process
according to the machining status of the shaped object 15.
The production process change unit 205 changes the pro-
duction process from the subtractive manufacturing process
to the additive manufacturing process when the status analy-
sis unit 204 has determined that the finished surface of the
shaped object 15 has a flaw. In addition, the production
process change unit 205 changes the production process
from the additive manufacturing process to the subtractive
manufacturing process when a notification is received from
the additive manufacturing execution unit 203 indicating
that the additive manufacturing process has been completed.

The production process change unit 205 sends, to the
subtractive manufacturing execution unit 207, the switching
command to provide switching from the additive manufac-
turing process to the subtractive manufacturing process and
the switching command to provide switching from the
subtractive manufacturing process to the additive manufac-
turing process. The production process change unit 205 also
sends the switching command to provide switching from the
subtractive manufacturing process to the additive manufac-
turing process, to the additive manufacturing execution unit
203. The production process change unit 205 further sends
a transport command with respect to the shaped object 15 to
the automated transportation unit 101 when a switching
command is sent to the additive manufacturing execution
unit 203 or to the subtractive manufacturing execution unit
207.

The process condition generation unit 206 receives the
machining status from the status analysis unit 204. When the
status analysis unit 204 has determined that the finished
surface has a flaw, the process condition generation unit 206
calculates process conditions to be used by the additive
manufacturing machine 200 after the change of the produc-
tion process. In this case, the process condition generation
unit 206 calculates the process conditions to be used by the
additive manufacturing machine 200 after the change of the production process, based on the process conditions used by the subtractive manufacturing machine 202 before the change of the production process and based on the machining status.

The process conditions used before the change of the production process include the head movement path HR21 and the like. The process condition generation unit 206 may obtain the process conditions used before the change of the production process, from the subtractive manufacturing execution unit 207, or may calculate the process conditions used before the change of the production process, based on the machining program 33. The process condition generation unit 206 sends the process conditions calculated, to the additive manufacturing execution unit 203. The process conditions calculated by the process condition generation unit 206 include the head movement path HR8 and the like.

The additive manufacturing execution unit 203 receives a switching command with respect to the production process, from the production process change unit 205. The additive manufacturing execution unit 203 also receives the process conditions from the process condition generation unit 206. The additive manufacturing execution unit 203 controls the head movement path HR8 and the output power value of the laser beam and the amount of supply of the material 5 on the head movement path HR8, based on the process conditions received from the process condition generation unit 206. Thus, the additive manufacturing execution unit 203 causes the additive manufacturing machine 200 to perform additive manufacturing on the shaped object 15.

An example of operation of the NC device 1A will next be described. FIG. 14 is a flowchart illustrating a procedure of operation performed by the NC device according to the second embodiment. Note that an operation similar to the operation described with reference to FIG. 3 will not be described again.

(Step S110)

At step S110, the machining program 33 is input to the subtractive manufacturing execution unit 207 from outside. This causes the subtractive manufacturing execution unit 207 to receive the machining program 33. As described above, the machining program 33 includes a move command for controlling the relative position between the workpiece 16 and the machining head 21 and a speed command for controlling the relative speed between the workpiece 16 and the machining head 21. The speed command with respect to the machining head 21 is a command with respect to the scanning speed at the machining position of the tool 19.

The move command with respect to the machining head 21 specifies move command details using coordinate values and a G code (e.g., G0, G1, or the like) representing the movement mode at these coordinate values. In addition, the speed command with respect to the machining head 21 commands speed command details using an F code in which speed value is described.

Performing subtractive manufacturing requires a tool rotation speed command value based on a desired surface roughness that has been set by a user. The tool rotation speed command value may be directly specified using an S code in the machining program 33 to achieve a desired surface roughness, or may be commanded using a G code or an M code. The NC device 1A advances the procedure to step S120 after performing step S110.

(Step S120)

At step S120, the subtractive manufacturing execution unit 207 analyzes the moving path for moving the machining head 21 in the subtractive manufacturing machine 202, based on process details described in the machining program 33 input from outside, and determines the moving path. The subtractive manufacturing execution unit 207 also determines the scanning speed, which is the moving speed of the machining head 21, based on the machining program 33. The subtractive manufacturing execution unit 207 further determines, based on the machining program 33, the tool rotation speed required for the subtractive manufacturing process. Then, the subtractive manufacturing execution unit 207 causes the subtractive manufacturing machine 202 to perform subtractive manufacturing using the moving path, the scanning speed, and the tool rotation speed that have been determined. The NC device 1A advances the procedure to step S130 after performing step S120.

(Step S130)

At step S130, the sensor data 34 for monitoring the machining status of the subtractive manufacturing machine 202 is collected from the subtractive manufacturing machine 202, and is input to the status analysis unit 204. This causes the status analysis unit 204 to obtain the sensor data 34.

The sensor data 34, which is sensor information, includes, for example, image data for measuring (or analyzing) a result of finish machining. The image data is data representing an image of the shaped object 15, and is obtained using at least one of a camera and a laser displacement meter. The sensor data 34 may include, instead of the image data for measuring the result of finish machining, data of load exerted on the head drive unit 20 (load torque exerted on the scanning shaft of the machining head 21) and data of position of the machining head 21. The NC device 1A advances the procedure to step S140 after performing step S130.

(Step S140)

At step S140, the status analysis unit 204 checks for, based on the image data included in the sensor data 34, a flaw, and/or the like, that has been caused by friction or mechanical vibration produced when the advancing direction of machining was switched to another. That is, the status analysis unit 204 determines whether the subtractive manufacturing process has been stably performed in the subtractive manufacturing machine 202. The image data included in the sensor data 34 is data of observation of whether subtractive manufacturing has been performed such that the shaped surface formed by the subtractive manufacturing process is uniform without variation or error.

When the status analysis unit 204 of the NC device 1A determines that the finished surface of the shaped object 15 is free of flaws (Yes at step S140), the NC device 1A advances the procedure to step S130.

Alternatively, when the status analysis unit 204 determines that the finished surface of the shaped object 15 has a flaw (No at step S140), the NC device 1A advances the procedure to step S150. When the status analysis unit 204 determines that the finished surface of the shaped object 15 has a flaw, the subtractive manufacturing execution unit 207 may cause the subtractive manufacturing machine 202 to perform subtractive manufacturing on the top surface of the shaped object 15 to eliminate the flaw.

Note that the status analysis unit 204 can also estimate a degree of friction or mechanical vibration produced when the advancing direction of machining was switched to another, based on the data of load exerted on the head drive unit 20 and on the data of position of the machining head 21. In this case, the status analysis unit 204 calculates the result of finish machining indirectly based on the data of load exerted on the head drive unit 20 and on the data of position of the machining head 21. That is, the status analysis unit 204 calculates the degree of friction or mechanical vibration based on the data of load and on the data of position, and then calculates the result of finish machining (e.g., whether there is a flaw) based on the degree of friction or mechanical vibration. In this case, the status analysis unit 204 analyzes whether there is a flaw caused by friction or mechanical vibration, based on the degree of the friction or mechanical vibration produced when the advancing direction of machining was switched to another.

(Step S150)

At step S150, the status analysis unit 204 notifies the production process change unit 205 and the process condition generation unit 206 that the finished surface of the shaped object 15 has a flaw. This causes the production process change unit 205 to interrupt the subtractive manufacturing process, and to change the production process to the additive manufacturing process, that is, to perform a production process switching operation. In this case, the subtractive manufacturing process is the first production process, and the additive manufacturing process is the second production process. In addition, the process condition used in the subtractive manufacturing process is the first process condition, and the process condition to be used in the additive manufacturing process is the second process condition.

The production process switching operation includes an operation in which the production process change unit 205 sends a signal of interruption (switching command) of the subtractive manufacturing process to the subtractive manufacturing execution unit 207 to temporarily interrupt the subtractive manufacturing process. The production process switching operation also includes an operation in which the production process change unit 205 causes the automated transportation unit 101 to perform an operation of transporting the shaped object 15 after completion of interruption of the subtractive manufacturing process. This operation of transporting the shaped object 15 is performed in such a manner that the production process change unit 205 causes the automated transportation unit 101 to take out the shaped object 15 from the subtractive manufacturing machine 202 and to place the shaped object 15 on the stage 13 of the additive manufacturing machine 200. The production process switching operation further includes an operation in which the production process change unit 205 sends a start signal (switching command) of an additive manufacturing process to the additive manufacturing execution unit 203 to cause the additive manufacturing execution unit 203 to prepare the additive manufacturing process. As described above, the production process change unit 205 sends a switching command to provide switching from the subtractive manufacturing process to the additive manufacturing process, to the additive manufacturing execution unit 203 and to the subtractive manufacturing execution unit 207. The NC device 1A advances the procedure to step S160 after performing step S150.

(Step S160)

At step S160, the process condition generation unit 206 determines process conditions for use by the additive manufacturing execution unit 203 in the additive manufacturing process. Specifically, the process condition generation unit 206 determines the moving path of the machining head 8, the scanning speed, the laser output power value of the machining head 8, and the amount of metal supply to be used in the additive manufacturing machine 200, and sets these values as the process conditions of the additive manufacturing process.

The process condition generation unit 206 sets the head movement path HR8 in the additive manufacturing machine 200 based on the machining program 33 input to the subtractive manufacturing machine 202. Specifically, the process condition generation unit 206 extracts the head movement path HR8 to enable all the flaws caused by friction or mechanical vibration that was produced when the advancing direction of machining was switched to another, and sets the head movement path HR8 extracted, as a process condition of the additive manufacturing process. In this operation, the process condition generation unit 206 extracts the head movement path HR8 for use in the additive manufacturing process to cause the head movement path HR8 to trace back the machining program 33 from the commanded point of temporary interruption in the subtractive manufacturing machine 202 with an offset in three-dimensional space. That is, the process condition generation unit 206 sets the head movement path HR8 for use in the additive manufacturing process to cause the head movement path HR8 to trace, with an offset portion given, the head movement path HR21 that has been set in the machining program 33, in the reverse direction from the position where the subtractive manufacturing machine 202 has interrupted the subtractive manufacturing process.

The process condition generation unit 206 also sets the scanning speed of the machining head 8 that has been set in the machining program 33 used by the additive manufacturing machine 200, as a process condition of the additive manufacturing process. In addition, the process condition generation unit 206 determines the command values of the laser output power value and of the amount of metal supply required for the additive manufacturing process to enable the formed flaws to be all eliminated. In this operation, the process condition generation unit 206 calculates the amount of addition in the additive manufacturing execution unit 203 based on factors such as the volumes of the flaws and the volumes of portions removed to eliminate the flaws. The process condition generation unit 206 then determines the laser output power value and the amount of metal supply for the commanded path with respect to the machining head position, based on the amount of addition in the additive manufacturing execution unit 203. The process condition generation unit 206 sends the head movement path HR8 and the laser output power value and the amount of metal supply on the head movement path HR8 to the additive manufacturing execution unit 203. The NC device 1A advances the procedure to step S170 after performing step S160.

(Step S170)

At step S170, the additive manufacturing execution unit 203 receives the head movement path HR8, the scanning speed, and the laser output power value and the amount of metal supply on the head movement path HR8, determined by the process condition generation unit 206. The additive manufacturing execution unit 203 thus determines the moving path of the machining head 8, the scanning speed, the laser output power value, and the amount of metal supply to be output to the additive manufacturing machine 200. The additive manufacturing execution unit 203 causes the additive manufacturing machine 200 to start an additive manufacturing process using the moving path, the scanning speed, the laser output power value, and the amount of metal supply that have been determined. The NC device 1A advances the procedure to step S180 after performing step S170.

(Step S180)

At step S180, after completion of the additive manufacturing process performed by the additive manufacturing execution unit 203, the production process change unit 205 performs an operation of returning the production process. The operation of returning the production process includes an operation in which the production process change unit 205 receives a notification of completion of additive manufacturing from the additive manufacturing execution unit 203. The operation of returning the production process also includes an operation in which the production process change unit 205 causes the automated transportation unit 101 to perform an operation of transporting the shaped object 15. This operation of transporting the shaped object 15 is performed in such a manner that the production process change unit 205 causes the automated transportation unit 101 to take out the shaped object 15 from the additive manufacturing machine 200 and to place the shaped object 15 on the stage 18 of the subtractive manufacturing machine 202. The operation of returning the production process further includes an operation in which the production process change unit 205 sends a start signal (switching command) of a subtractive manufacturing process to the subtractive manufacturing execution unit 207 to cause the subtractive manufacturing execution unit 207 to prepare the subtractive manufacturing process. The NC device 1A advances the procedure to step S190 after performing step S180.

(Step S190)

At step S190, the subtractive manufacturing execution unit 207 causes the subtractive manufacturing machine 202 to resume the subtractive manufacturing process. That is, the subtractive manufacturing execution unit 207 restarts analysis of the head movement path HR21 for moving the machining head 21 from the end position of additive manufacturing in the additive manufacturing execution unit 203, based on process details described in the machining program 33. The subtractive manufacturing execution unit 207 thus determines the head movement path HR21 and the scanning speed. The subtractive manufacturing execution unit 207 also determines the command value of the tool rotation speed required for the subtractive manufacturing process based on the machining program 33. Then, the subtractive manufacturing execution unit 207 causes the subtractive manufacturing machine 202 to resume the subtractive manufacturing process using the moving path, the scanning speed, and the tool rotation speed that have been determined. The NC device 1A advances the procedure to step S200 after performing step S190.

(Step S200)

At step S200, the NC device 1A determines whether all the operations described in the machining program 33 have been completed. When not all the operations described in the machining program 33 have been completed (No at step S200), the NC device 1A repeats the process from step S130 to step S200. The NC device 1A repeats the process from step S130 to step S200 until all the operations described in the machining program 33 are completed. When all the operations described in the machining program 33 have been completed (Yes at step S200), the NC device 1A terminates the process of controlling production of the shaped object 15.

As described above, the NC device 1A is capable of detecting a flaw caused by friction or mechanical vibration that was produced when the advancing direction of machining in the subtractive manufacturing process was switched to another, and then changing the production process from the subtractive manufacturing process to the additive manufacturing process. This enables the NC device 1A to automatically correct the production process and to accurately produce the shaped object 15 having a desired shape efficiently even when a defect is generated during finish machining in the subtractive manufacturing machine 202.

A specific example of the shaped object 15 produced by the additive manufacturing machine 200 will now be described. FIG. 15 is a diagram illustrating an example of the shaped object produced through subtractive manufacturing that the NC device according to the second embodiment has caused the subtractive manufacturing machine to perform. The shaped object 53 illustrated in FIG. 15 is an example of the shaped object 15 produced by the subtractive manufacturing machine 202.

The machining program 33 for use in the subtractive manufacturing process according to the second embodiment includes a description, for example, of a command to perform finish machining on the topmost surface of the shaped object 50 produced by additive manufacturing in the first embodiment. FIG. 15 illustrates the shaped object 53 produced using the machining programs 23 and 33. The machining program 23 is a program for manufacturing the shaped object 50 by stacking layers of the material 5 from the first layer to the N-th layer. The machining program 33 is a program for manufacturing the shaped object 53 from the shaped object 50 by removing the top surface of the shaped object 50 from a first block to M (where M is a natural number).

The machining program 33 is input to the subtractive manufacturing execution unit 207 from outside the NC device 1A. The second embodiment is described with respect to a case in which a flaw is formed on a surface of the shaped object due to friction or mechanical vibration during execution of a command in manufacturing process for a portion near an $M_1$-th (where $M_1$ is a natural number from 1 to M) block, which is the removal block, after execution of the machining program 33 was started. Operations of components of the NC device 1A in this situation, different from the operations in the first embodiment, will be described below.

(Status Analysis Unit 204) The status analysis unit 204 of the NC device 1A collects the sensor data 34 from a sensor provided in the subtractive manufacturing machine 202, and estimates the machining status during subtractive manufacturing based on the sensor data 34. Specifically, the status analysis unit 204 obtains, from the sensor data 34, image data obtained by observation of the surface shape formed by the subtractive manufacturing machine 202. Then, the status analysis unit 204 extracts a shape feature quantity from the image data, which has been obtained by measurement of the product shape formed by the subtractive manufacturing machine 202. The shape feature quantity extracted in this operation includes at least one of the curvature, the shape height, the shape width, and the like. The status analysis unit 204 calculates the feature quantity including at least one of the curvature, the shape height, the shape width, and the like using an image analysis technique such as edge detection or binarization.

The status analysis unit 204 analyzes a flaw caused by friction or mechanical vibration based on the image data. In the second embodiment, when the status analysis unit 204 compares the $M_1$-th block with a specified block other than the $M_1$-th block, the $M_1$-th block has a shape height less than the shape height of another region because the Z-axis position representing the shape height is lower in the negative direction due to friction or mechanical vibration. The status analysis unit 204 thus generates a shaping error signal when the shape height has a variation larger than variations in other regions.

In the second embodiment, the status analysis unit 204 detects a flaw caused by friction or mechanical vibration at a single point in a command for the $M_1$-th block somewhere in the machining program 33, and then generates a shaping error signal. However, the status analysis unit 204 can also detect a flaw or flaws at one or more other points.

As described above, according to the second embodiment, the NC device 1A detects a flaw in the surface shape caused by friction or mechanical vibration in a subtractive manufacturing process, and changes the production process from the subtractive manufacturing process to the additive manufacturing process. In this operation, the NC device 1A determines process conditions including the head movement path HR8 for use in the additive manufacturing process, based on the process conditions used in the subtractive manufacturing machine 202. This enables the NC device 1A to automatically correct the production process and to accurately produce the shaped object 53 having a desired shape efficiently even when a defect is generated in the shaped object 15 during finish machining.

A hardware configuration of the NC devices 1 and 1A will next be described. The NC devices 1 and 1A are each implemented in a processing circuitry. The processing circuitry may be a processor that executes a program stored in a memory and the memory, or may be a dedicated hardware element such as a dedicated circuit. A processing circuitry is also called control circuit.

Figure 16:
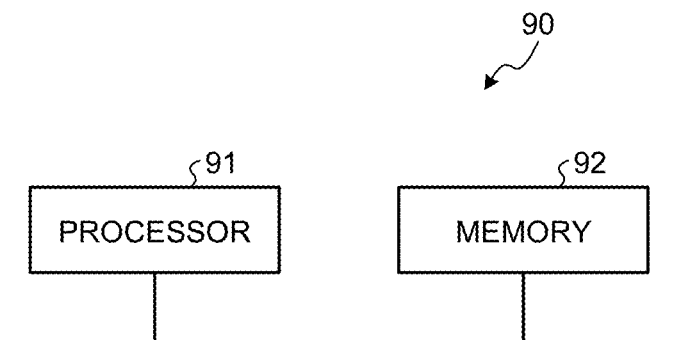
FIG. 16 is a diagram illustrating an example configuration of a processing circuitry included in each of the NC devices according to the first and second embodiments when the processing circuitry is implemented by a processor and a memory.

FIG. 16 is a diagram illustrating an example configuration of a processing circuitry included in each of the NC devices according to the first and second embodiments when the processing circuitry is implemented by a processor and a memory. A processing circuitry 90 illustrated in FIG. 16 is a control circuit, and includes a processor 91 and a memory 92. When the processing circuitry 90 includes the processor 91 and the memory 92, each functionality of the processing circuitry 90 is implemented in software, firmware, or a combination of software and firmware. The software or firmware is described in the form of a program, and is stored in the memory 92. In the processing circuitry 90, the processor 91 reads and executes a program stored in the memory 92 to implement each functionality. That is, the processing circuitry 90 includes the memory 92 for storing a program that causes the processing of each of the NC devices 1 and 1A to be performed. It can also be said that this program is a program for causing each of the NC devices 1 and 1A to perform each functionality to be implemented in the processing circuitry 90. This program may be provided using a storage medium storing the program, or may be provided using another means such as a communication medium. The above program can also be said to be a program that causes each of the NC devices 1 and 1A to perform numerical control processing.

In this respect, the processor 91 is, for example, a central processing unit (CPU), a processing unit, a computing unit, a microprocessor, a microcomputer, a digital signal processor (DSP), or the like. In addition, the memory 92 is, for example, a non-volatile or volatile semiconductor memory such as a random access memory (RAM), a read-only memory (ROM), a flash memory, an erasable programmable ROM (EPROM), or an electrically erasable programmable ROM (EEPROM) (registered trademark); a magnetic disk, a flexible disk, an optical disk, a compact disc, a MiniDisc, a digital versatile disc (DVD), or the like.

Figure 17:
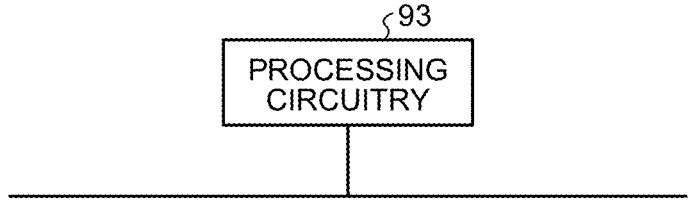
FIG. 17 is a diagram illustrating an example of the processing circuitry included in each of the NC devices according to the first and second embodiments when the processing circuitry includes a dedicated hardware element.

FIG. 17 is a diagram illustrating an example of the processing circuitry included in each of the NC devices according to the first and second embodiments when the processing circuitry includes a dedicated hardware element.

A processing circuitry 93 illustrated in FIG. 17 is, for example, a single circuit, a set of multiple circuits, a programmed processor, a parallel programmed processor, an application specific integrated circuit (ASIC), a field programmable gate array (FPGA), or a combination thereof. The processing circuitry 93 may be implemented partially in a dedicated hardware element, and partially in software or firmware. Thus, the processing circuitry 93 can implement each foregoing functionality by a dedicated hardware element, software, firmware, or a combination thereof.

The configurations described in the foregoing embodiments are merely examples. These configurations may be combined with a known other technology, and configurations of different embodiments may be combined together. Moreover, part of such configurations may be omitted and/or modified without departing from the spirit thereof.

REFERENCE SIGNS LIST

1, 1A NC device; 2 laser oscillator; 3 fiber cable; 4 material supply unit; 5 material; 6 gas supply unit; 7 pipe; 8, 21 machining head; 9 beam nozzle; 10 material nozzle; 11 gas nozzle; 12, 20 head drive unit; 13, 18 stage; 14 base substrate; 15, 50, 51A-51C, 53 shaped object; 16 workpiece; 17 hand mechanism; 19 tool; 22 spindle drive unit; 23, 33 machining program; 24, 34 sensor data; 25 hand drive unit; 41A, 42A additive manufacturing path; 41F, 42F stack shape; 46R1, 46R2, 47R1, 47R2 subtractive manufacturing path; 60 machining system; 90, 93 processing circuitry; 91 processor; 92 memory; 100, 200 additive manufacturing machine; 101 automated transportation unit; 102, 202 subtractive manufacturing machine; 103, 203 additive manufacturing execution unit; 104, 204 status analysis unit; 105, 205 production process change unit; 106, 206 process condition generation unit; 107, 207 subtractive manufacturing execution unit.

The invention claimed is:

1. A numerical control device comprising:

additive manufacturing execution circuitry to control an additive manufacturing machine that performs an additive manufacturing process in which a shaped object is produced by stacking layers of a material melted by emission of a beam from a first machining head;

subtractive manufacturing execution circuitry to control a subtractive manufacturing machine that performs a subtractive manufacturing process in which the shaped object is cut using a tool disposed on a second machining head;

status analysis circuitry to receive sensor data obtained by monitoring of a machining status of the shaped object, and to analyze the machining status of the shaped object based on the sensor data, the shaped object being produced by a combination of two production processes, the two production processes being the additive manufacturing process and the subtractive manufacturing process;

production process change circuitry to generate a switching command that commands switching with respect to which of the two production processes is to be performed, based on a result of analysis of the machining status, and to output the switching command to the additive manufacturing execution circuitry and to the subtractive manufacturing execution circuitry; and process condition generation circuitry to determine, upon switching between the two production processes, a second process condition to be used in a second production process based on a first process condition that has been used in a first production process, the first production process being a production process performed before the switching, of the two production processes, the second production process being a production process to be performed after the switching, of the two production processes, wherein a moving direction on a machining path to be used in the second production process is opposite to a moving direction on a machining path used in the first production process.

2. The numerical control device according to claim 1, wherein the second production process uses a machining path including an offset portion, the offset portion being a path generated by offsetting, in three-dimensional space, a machining path used in the first production process.

3. The numerical control device according to claim 2, wherein when the first production process is the additive manufacturing process, and the second production process is the subtractive manufacturing process, the process condition generation circuitry sets, for the offset portion, an offset amount that allows removal of an amount of deviation from a desired value of a height or a width of the shaped object, experienced in the first production process.

4. The numerical control device according to claim 1, wherein the sensor data includes a value of load torque exerted on a scanning shaft of the subtractive manufacturing machine.

5. The numerical control device according to claim 1, wherein when the first production process is the additive manufacturing process, and the second production process is the subtractive manufacturing process, the second process condition includes a scanning speed of the second machining head and a spindle rotation speed, and the process condition generation circuitry determines the scanning speed of the second machining head and the spindle rotation speed based on a volume of the shaped object to be removed in the second production process.

6. The numerical control device according to claim 1, wherein when the first production process is the subtractive manufacturing process, and the second production process is the additive manufacturing process, the second process condition includes a scanning speed, laser output power, and an amount of supply of the material, each of the first machining head, and the process condition generation circuitry determines the scanning speed, the laser output power, and the amount of supply of the material, each of the first machining head, based on a volume of the shaped object to be added in the second production process.

7. The numerical control device according to claim 1, wherein the status analysis circuitry estimates a welding status or a shape condition of the shaped object based on the sensor data, and the production process change circuitry determines whether to continue the first production process or to output a switching command, based on a result of estimation performed by the status circuitry.

8. The numerical control device according to claim 1, wherein the sensor data includes data of at least one of a height, a width, or a temperature of a specific layer of the shaped object.

9. The numerical control device according to claim 1, wherein the sensor data includes a value of load torque exerted on material supply circuitry that supplies the material.

10. A numerical control method comprising:

controlling an additive manufacturing machine that performs an additive manufacturing process in which a shaped object is produced by stacking layers of a material melted by emission of a beam from a first machining head;

controlling a subtractive manufacturing machine that performs a subtractive manufacturing process in which the shaped object is cut using a tool disposed on a second machining head;

receiving sensor data obtained by monitoring of a machining status of the shaped object, and analyzing the machining status of the shaped object based on the sensor data, the shaped object being produced by a combination of two production processes, the two production processes being the additive manufacturing process and the subtractive manufacturing process;

performing switching with respect to which of the two production processes is to be performed, based on a result of analysis of the machining status; and determining, upon switching between the two production processes, a second process condition to be used in a second production process based on a first process condition that has been used in a first production process, the first production process being a production process performed before the switching, of the two production processes, the second production process being a production process to be performed after the switching, of the two production processes, wherein a moving direction on a machining path to be used in the second production process is opposite to a moving direction on a machining path used in the first production process.

* * * * *